US012802578B2

(12) United States Patent
Minagawa

(10) Patent No.: US 12,802,578 B2
(45) Date of Patent: Nov. 17, 2026

(54) DISPLAY CONTROL DEVICE, DISPLAY CONTROL METHOD, AND STORAGE MEDIUM STORING DISPLAY CONTROL PROGRAM

(71) Applicant: Mitsubishi Electric Corporation, Tokyo (JP)

(72) Inventor: Jun Minagawa, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 34 days.

(21) Appl. No.: 18/985,783

(22) Filed: Dec. 18, 2024

(65) Prior Publication Data

US 2025/0118215 A1 Apr. 10, 2025

Related U.S. Application Data

(63) Continuation of application No. PCT/JP2022/031522, filed on Aug. 22, 2022.

(51) Int. Cl.
*G08G 5/54* (2025.01)
*G08G 5/23* (2025.01)
(Continued)

(52) U.S. Cl.
CPC ................. *G08G 5/54* (2025.01); *G08G 5/23* (2025.01); *G08G 5/51* (2025.01); *G08G 5/56* (2025.01); *G08G 5/80* (2025.01)

(58) Field of Classification Search
CPC .. G08G 5/54; G08G 5/23; G08G 5/51; G08G 5/56; G08G 5/80
See application file for complete search history.

(56) References Cited

U.S. PATENT DOCUMENTS 11,726,484 B1 * 8/2023 Gerdes ................. G05D 1/0231 701/26
2022/0309934 A1 * 9/2022 Panchangam ............ G08G 5/53
(Continued)

FOREIGN PATENT DOCUMENTS

JP 2006-350445 A 12/2006
JP 4461182 B2 * 5/2010
(Continued)

OTHER PUBLICATIONS

International Search Report, issued in PCT/JP2022/031522, PCT/ISA/210, dated Nov. 8, 2022.
(Continued)

*Primary Examiner* — Donald J Wallace
*Assistant Examiner* — Keith A von Volkenburg
(74) *Attorney, Agent, or Firm* — Birch, Stewart, Kolasch & Birch, LLP

(57) ABSTRACT

A display control device includes processing circuitry to estimate a second mobile object as a mobile object having an abnormal approach period out of a plurality of relevant mobile objects, to make a display device display a two-dimensional coordinate system formed by a first coordinate axis representing positions from a start point to an end point of a first predicted trajectory by distances and a second coordinate axis representing a time, a line indicating the first predicted trajectory, and an abnormal approach region indicating ranges of the position and the time of the second mobile object, and to make the display device display a display component, and upon receiving input information for moving the display component, to correct the first predicted trajectory so that the line indicating the first predicted trajectory does not overlap with the abnormal approach region.

14 Claims, 22 Drawing Sheets

(51) Int. Cl.

| | |
|---|---|
| ***G08G 5/51*** | (2025.01) |
| ***G08G 5/56*** | (2025.01) |
| ***G08G 5/80*** | (2025.01) |

(56) References Cited

U.S. PATENT DOCUMENTS

| | | | | |
|---|---|---|---|---|
| 2024/0083419 | A1* | 3/2024 | Haruta .............. | B60W 30/0956 |
| 2024/0312353 | A1 | 9/2024 | Minagawa et al. | |

FOREIGN PATENT DOCUMENTS

| | | | |
|---|---|---|---|
| WO | WO 2023/127127 | A1 | 7/2023 |
| WO | WO 2023/127194 | A1 | 7/2023 |

OTHER PUBLICATIONS

Klomp et al., "Re-design of an Inbound Planning Interface for Air Traffic Control", American Institute of Aeronautics and Astronautics, Jun. 14, 2012, total 27 pages.

* cited by examiner

DISPLAY CONTROL DEVICE, DISPLAY CONTROL METHOD, AND STORAGE MEDIUM STORING DISPLAY CONTROL PROGRAM

CROSS-REFERENCE TO RELATED APPLICATION

This application is a continuation application of International Application No. PCT/JP2022/031522 having an international filing date of Aug. 22, 2022, which is hereby expressly incorporated by reference into the present application.

BACKGROUND OF THE INVENTION

1. Field of the Invention

The present disclosure relates to a display control device, a display control method and a display control program.

2. Description of the Related Art

There has been proposed a control information display system including a display means that displays a movement route of a mobile object (e.g., aircraft, vehicle or the like) traveling on the ground in an airport on a two-dimensional plane formed by a coordinate axis representing the time and a coordinate axis representing the position (see Patent Reference 1, for example). A situation where the need for paying attention arises in a selected mobile object is a situation where a different mobile object shares part of the course of the selected mobile object. The sharing of the course occurs in cases where a taxiway forming the course of the selected mobile object and a taxiway forming the course of the different mobile object intersect with each other at an intersection and in cases where the selected mobile object and the different mobile object travel in the same direction or in opposite directions on a common taxiway. Therefore, in the system of the Patent Reference 1, a two-dimensional plane indicating a traveling condition of the selected mobile object and another two-dimensional plane indicating a traveling condition of the different mobile object are displayed so as to intersect with each other, namely, the traveling conditions of the two mobile objects are displayed three-dimensionally.

Patent Reference 1: Japanese Patent Application Publication No. 2006-350445 (claims 1 and 2, paragraphs 0038 and 0039, and FIG. 4 to FIG. 6, for example).

However, in the case of the display mode three-dimensionally displaying the traveling conditions of the two mobile objects, an air traffic controller viewing a display means cannot easily make prediction of an abnormal approach between mobile objects and a correction of a trajectory for avoiding the abnormal approach (that can include collision).

SUMMARY OF THE INVENTION

An object of the present disclosure is to provide a display control device, a display control method and a display control program that make it possible to easily make the prediction of an abnormal approach between mobile objects and the correction of a predicted trajectory for avoiding the abnormal approach.

A display control device in the present disclosure is a device in a control system that transmits commands to a plurality of mobile objects traveling on a plurality of tracks. The display control device includes processing circuitry to acquire track structure data indicating structure of the plurality of tracks; to acquire control information from a management device that manages the control information including positions and operation schedules of the plurality of mobile objects; to estimate a plurality of predicted trajectories indicating movement routes of the plurality of mobile objects based on the track structure data and the control information; to acquire a first predicted trajectory indicating the movement route of a first mobile object as a mobile object selected as a monitoring target from among the plurality of mobile objects and a plurality of relevant predicted trajectories indicating the movement routes of a plurality of relevant mobile objects being mobile objects other than the first mobile object from the plurality of predicted trajectories; to estimate a second mobile object as a mobile object having an abnormal approach period in which a distance from the first mobile object is less than or equal to a predetermined reference value out of the plurality of relevant mobile objects based on the track structure data, the first predicted trajectory and the plurality of relevant predicted trajectories; to make a display device display a two-dimensional coordinate system formed by a first coordinate axis representing positions from a start point to an end point of the first predicted trajectory by distances from the start point or the end point and a second coordinate axis representing a time, a line indicating the first predicted trajectory in the two-dimensional coordinate system, and an abnormal approach region indicating ranges of the position and the time of the second mobile object in the abnormal approach period; and to make the display device display a display component for updating the first predicted trajectory, and upon receiving input information for moving the display component, to correct the first predicted trajectory so that the line indicating the first predicted trajectory does not overlap with the abnormal approach region.

A display control method in the present disclosure is a method to be executed by a display control device in a control system that transmits commands to a plurality of mobile objects traveling on a plurality of tracks. The display control method includes acquiring track structure data indicating structure of the plurality of tracks; acquiring control information from a management device that manages the control information including positions and operation schedules of the plurality of mobile objects; estimating a plurality of predicted trajectories indicating movement routes of the plurality of mobile objects based on the track structure data and the control information; acquiring a first predicted trajectory indicating the movement route of a first mobile object as a mobile object selected as a monitoring target from among the plurality of mobile objects and a plurality of relevant predicted trajectories indicating the movement routes of a plurality of relevant mobile objects being mobile objects other than the first mobile object from the plurality of predicted trajectories; estimating a second mobile object as a mobile object having an abnormal approach period in which a distance from the first mobile object is less than or equal to a predetermined reference value out of the plurality of relevant mobile objects based on the track structure data, the first predicted trajectory and the plurality of relevant predicted trajectories; making a display device display a two-dimensional coordinate system formed by a first coordinate axis representing positions from a start point to an end point of the first predicted trajectory by distances from the start point or the end point and a second coordinate axis representing a time, a line indicating the first predicted trajectory in the two-dimensional coordinate system, and an abnormal approach region indicating ranges of the position and the time of the second mobile object in the abnormal approach period; and making the display device display a display component for updating the first predicted trajectory, and upon receiving input information for moving the display component, correcting the first predicted trajectory so that the line indicating the first predicted trajectory does not overlap with the abnormal approach region.

According to the present disclosure, the prediction of an abnormal approach between mobile objects and the correction of a predicted trajectory for avoiding the abnormal approach can be made with ease.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

A display control device, a display control method and a display control program according to an embodiment will be described below with reference to the drawings. The following embodiments are just examples and it is possible to appropriately combine embodiments and appropriately modify each embodiment.

Figure 1:
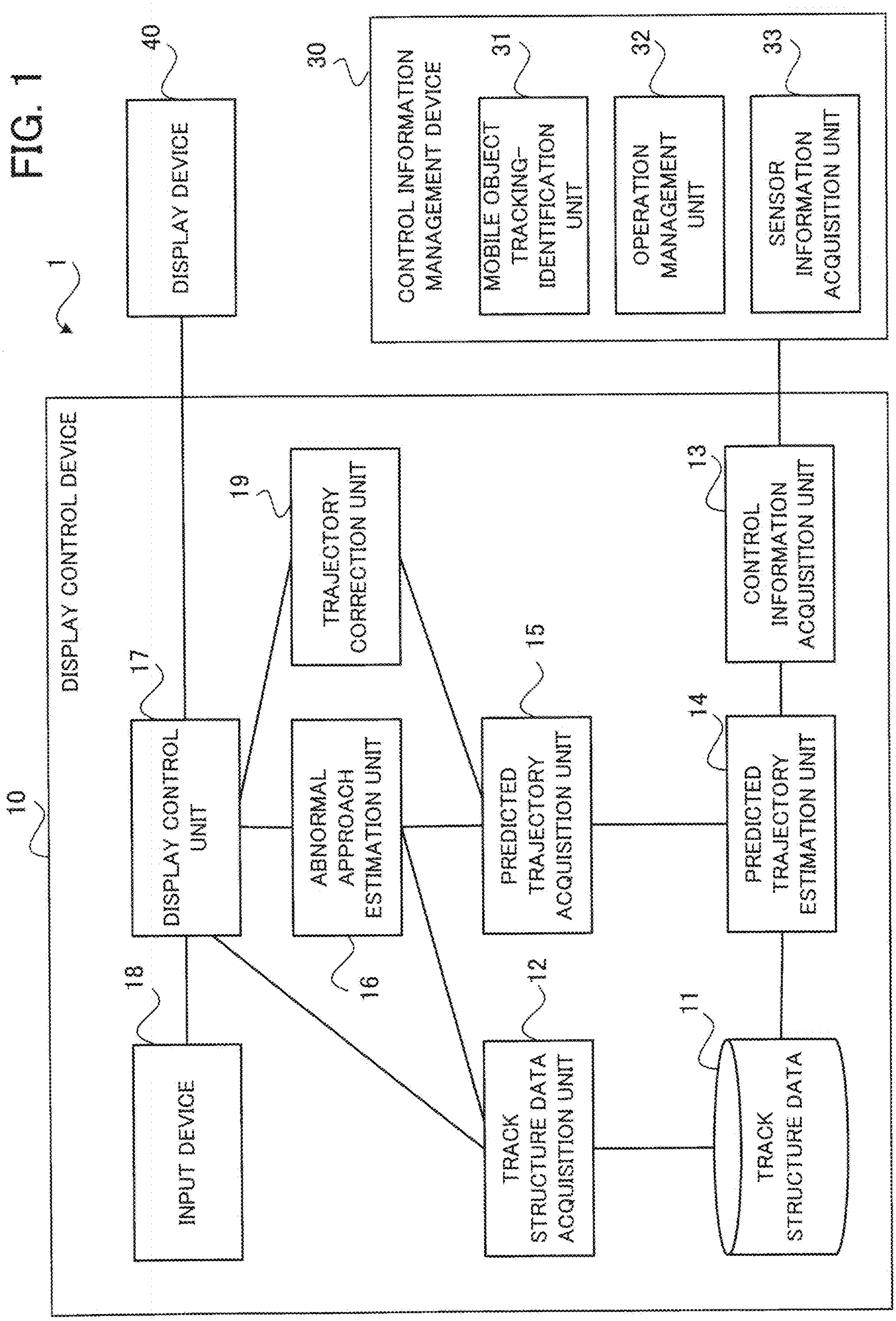
FIG. 1 is a functional block diagram schematically showing the configuration of a display control device and a control system according to an embodiment.

FIG. 1 is a functional block diagram schematically showing the configuration of a display control device 10 according to an embodiment. The display control device 10 is a device capable of executing a display control method according to the embodiment. The display control device 10 is, for example, a computer executing a display control program according to the embodiment.

The display control device 10 is part of a control system (i.e., air traffic control system) 1 that transmits commands to a plurality of mobile objects traveling on a plurality of tracks on the ground. The control system 1 includes a control information management device 30 as a management device and a display device 40 such as a liquid crystal monitor that displays images. The control system 1 is, for example, an airport traffic control system that transmits commands to a plurality of aircrafts as a plurality of mobile objects. The plurality of tracks are runways and taxiways in an airport, for example. In general, the control system of the airport handles flying aircraft and taxiing aircraft as targets of the air traffic control. However, the mobile objects to which the control system 1 in the present disclosure transmits commands are mobile objects traveling on the ground (including aircraft with the wheels not in contact with a runway and flying immediately above the runway at the time of landing or takeoff). The mobile object is not limited to an aircraft but can also be a vehicle such as an automobile. Further, the mobile objects may include both of an aircraft and a vehicle.

The control information management device 30 includes a mobile object tracking-identification unit 31, an operation management unit 32 and a sensor information acquisition unit 33. The mobile object tracking-identification unit 31 keeps track of the positions of the plurality of mobile objects and identifies each of the plurality of mobile objects. The operation management unit 32 manages operation management information including operation times of the plurality of mobile objects and an operation route of each of the plurality of mobile objects from a movement starting point (i.e., start point) to a destination (i.e., end point). The sensor information acquisition unit 33 receives sensing information regarding a mobile object from a sensor sensing the mobile object.

The display control device 10 includes a track structure data acquisition unit 12, a control information acquisition unit 13, a predicted trajectory estimation unit 14, a predicted trajectory acquisition unit 15, an abnormal approach estimation unit 16, a display control unit 17, an input device 18 and a trajectory correction unit 19.

The track structure data acquisition unit 12 acquires track structure data indicating the structure of the plurality of tracks from a storage device 11. The track structure data is, for example, map data of the tracks. Specifically, the track structure data acquisition unit 12 reads out the structure of the tracks (e.g., length of each taxiway and the like) stored in the storage device 11 such as a nonvolatile memory and gives the structure to the abnormal approach estimation unit 16. While the storage device 11 is shown as part of the display control device 10 in FIG. 1, the storage device 11 can also be an external storage device capable of communicating with the display control device 10.

The control information acquisition unit 13 acquires control information (e.g., air traffic control information) from the control information management device 30 that manages the control information including the positions and operation schedules of the plurality of mobile objects. Specifically, the control information acquisition unit 13 acquires present positions of the mobile objects, the operation management information, and so forth managed by the control information management device 30.

The predicted trajectory estimation unit 14 estimates predicted trajectories (e.g., scheduled loci of mobile objects traveling on the ground) indicating movement routes of the plurality of mobile objects based on the track structure data and the control information. Specifically, the predicted trajectory estimation unit 14 estimates the predicted trajectories and the present positions of the mobile objects based on the present positions of the mobile objects and the operation management information acquired from the control information acquisition unit 13. The predicted trajectories also include loci of aircraft with the wheels not in contact with the runway and flying immediately above the runway at the time of landing or takeoff.

The predicted trajectory acquisition unit 15 acquires a first predicted trajectory indicating the movement route of a mobile object selected as a monitoring target (referred to also as a "selected mobile object" or a "first mobile object") among the plurality of mobile objects and a plurality of second predicted trajectories indicating the movement routes of a plurality of relevant mobile objects being mobile objects other than the selected mobile object from the estimated predicted trajectories. Specifically, the predicted trajectory acquisition unit 15 reads out the predicted trajectories (predicted loci) of the mobile objects calculated by the predicted trajectory estimation unit 14 and gives the predicted trajectories to the abnormal approach estimation unit 16.

The abnormal approach estimation unit 16 estimates an abnormal approach mobile object as a mobile object having a period in which the distance from the selected mobile object is less than or equal to a predetermined reference value (i.e., threshold value) out of the plurality of relevant mobile objects and estimates the position of the mobile object (referred to also as the "abnormal approach mobile object" or a "second mobile object") in the abnormal approach period based on the track structure data, the first predicted trajectory and the plurality of second predicted trajectories. Specifically, the abnormal approach estimation unit 16 refers to the selected mobile object acquired from the input device 18 and estimates an abnormal approach region (e.g., near collision region) of the mobile object. The estimated abnormal approach region is given to the display control unit 17 and thereby displayed as an enhanced display component in superimposition on a diagram. The abnormal approach region is calculated based on the structure of the track of the mobile object (e.g., the length of the taxiway or the like) acquired from the track structure data acquisition unit 12 and the predicted trajectory of the mobile object acquired from the predicted trajectory acquisition unit 15.

The abnormal approach estimation unit 16 may acquire information regarding a visibility range in atmospheric air (maximum distance at which the shape of a target can be recognized with the naked eye) at a plurality of tracks (e.g., measurement values of visibility meters) from the control information management device 30 and modify the predetermined reference value based on the acquired visibility range.

For example, the reference value can be adjusted properly by increasing the reference value with the decrease in the visibility range due to the atmospheric air condition such as fog, rain and snow. Further, the abnormal approach estimation unit 16 may acquire information regarding a wind direction and wind speed at a plurality of tracks (e.g., measurement values of anemoscopes and anemometers) from the control information management device 30 and modify the predetermined reference value based on the wind direction and the wind speed. For example, the reference value can be adjusted properly by increasing the reference value when the wind direction is a following wind direction with the increase in the wind speed. Furthermore, the abnormal approach estimation unit 16 may acquire information regarding the size of the selected mobile object and the size of the abnormal approach mobile object (e.g., data regarding the aircraft, mobile object size information and inter-mobile object distance information obtained by analysis of camera images, and so forth) from the control information management device 30 and modify the predetermined reference value based on the size of the selected mobile object and the size of the abnormal approach mobile object. For example, a braking distance as the distance necessary for stopping increases with the increase in the size (i.e., with the increase in the weight) of the selected mobile object and with the increase in the size of the abnormal approach mobile object, and thus the reference value can be adjusted properly by increasing the reference value with the increase in the size of the selected mobile object and with the increase in the size of the abnormal approach mobile object. This is because a larger mobile object has greater weight and its braking distance as the distance necessary for stopping is longer.

The display control unit 17 makes the display device 40 display a two-dimensional coordinate system, formed by a first coordinate axis representing positions from a start point to an end point of the first predicted trajectory by distances from the start point (the unit is [m], for example, and the distance can also be the distance from the end point) and a second coordinate axis representing the time (e.g., elapsed time since a reference time to, the unit is [s], for example), and a line indicating the first predicted trajectory in the two-dimensional coordinate system. Specifically, in this embodiment, the display control unit 17 makes the display device 40 display the two-dimensional coordinate system formed by the first coordinate axis representing the positions from the start point to the end point of the first predicted trajectory by distances from the start point or the end point and the second coordinate axis representing the time, the line indicating the first predicted trajectory in the two-dimensional coordinate system, and the abnormal approach region indicating ranges of the time and the position of the second mobile object in the abnormal approach period. The two-dimensional coordinate system and the line indicating the predicted trajectory are referred to also as a diagram. The diagram is displayed by referring to selection information from the air traffic controller (i.e., user of the system) inputted through the input device 18. Further, the display control unit 17 makes the display device 40 display the enhanced display component indicating the position of the abnormal approach mobile object in the abnormal approach period in the two-dimensional coordinate system. The enhanced display component is displayed in superimposition on the diagram. Specifically, the display control unit 17 makes the display device 40 display figures representing the mobile objects, a map, the enhanced display component, and so forth. The enhanced display component is, for example, a display component obtained by filling in a predetermined figure (e.g., circle, quadrangle, star or the like) with a predetermined color (e.g., yellow, orange, red or the like). The enhanced display component can also be a display component using variation in the luminance by blinking, variation in the color, variation in the shape, or a combination of two or more of these variations.

The input device 18 is an operation input unit that receives inputs from the air traffic controller. The input device 18 is, for example, a keyboard, a mouse, a touch panel, a microphone for audio input, or the like. The input from the air traffic controller is, for example, an operation of selecting the trajectory of a mobile object to be displayed or the like. The input device 18 gives the input from the air traffic controller to the display control unit 17 as input data.

Figure 19A:
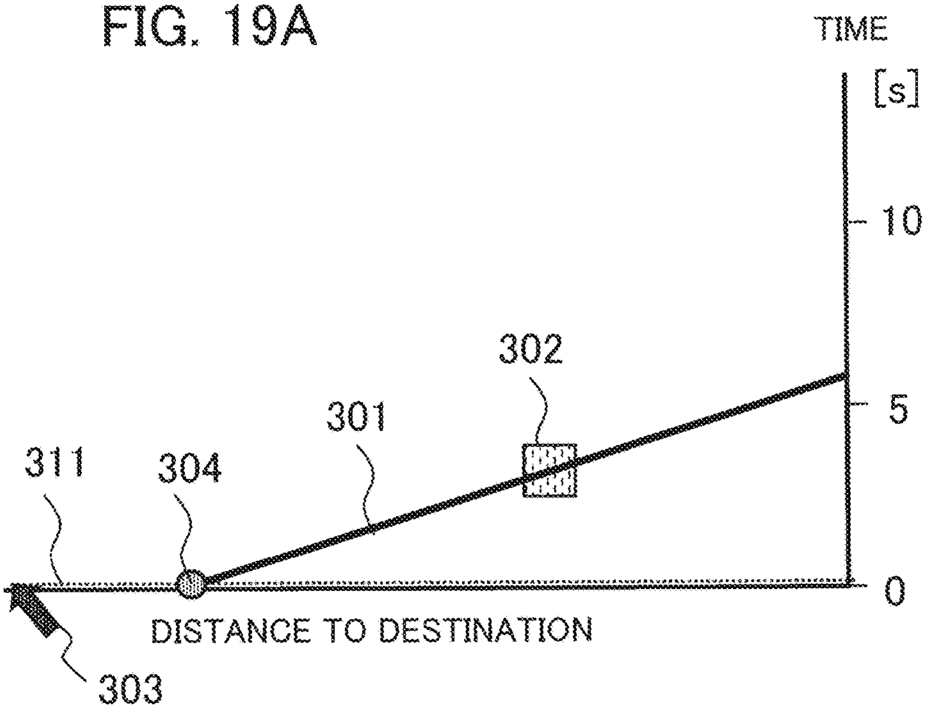
FIGS. 19A and 19B are diagrams (No. 1) showing an example of a diagram screen and a situation screen at the time of the trajectory correction.

The trajectory correction unit 19 makes the display device 40 display a display component for updating the first predicted trajectory, and upon receiving input information for moving the display component, corrects the first predicted trajectory so that the line indicating the first predicted trajectory does not overlap with the abnormal approach region. Here, the display component is, for example, a dot-like component overlapping with the line indicating the first predicted trajectory displayed on the display device 40 and not overlapping with the abnormal approach region. The dot-like component is shown in FIG. 19A and the like which will be explained later, for example. The display component is displayed at a position of a time temporally earlier than the time range of the abnormal approach region. When there occurs a user input operation for moving a display component displayed on the display device 40 in the direction of the second coordinate axis (e.g., operation through the input device 18), the trajectory correction unit 19 generates an updated predicted trajectory by moving part of the line indicating the first predicted trajectory temporally after the display component in the direction of the movement of the display component.

Figure 2:
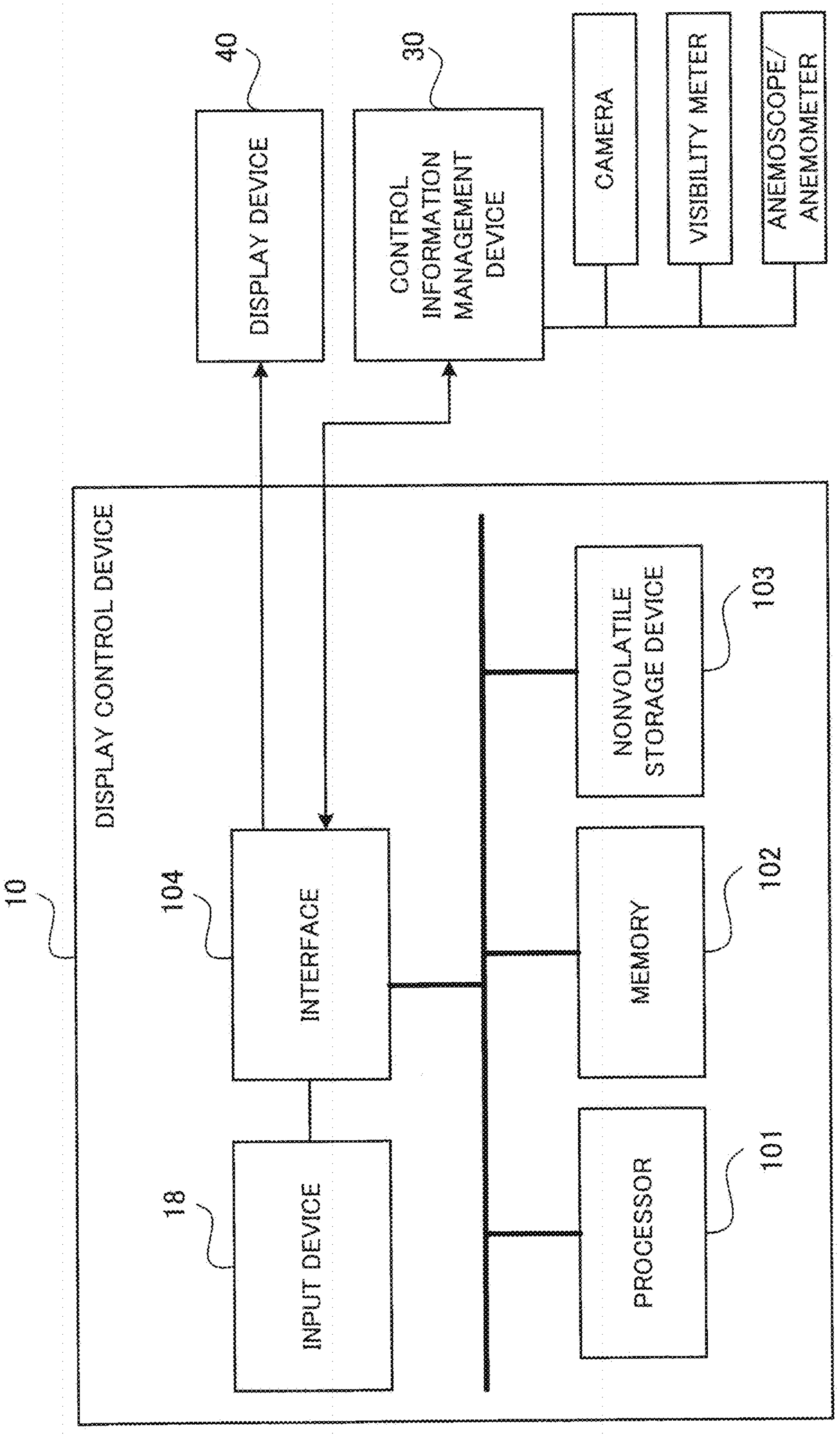
FIG. 2 is a diagram showing an example of the hardware configuration of the display control device according to the embodiment.

FIG. 2 is a diagram showing an example of the hardware configuration of the display control device 10. As shown in FIG. 2, the display control device 10 includes a processor 101 such as a CPU (Central Processing Unit), a memory 102 as a volatile storage device, a nonvolatile storage device 103 such as a hard disk drive (HDD) or a solid state drive (SSD), and an interface 104. The memory 102 is a semiconductor memory such as a RAM (Random Access Memory), for example. The nonvolatile storage device 103 can be the same device as the storage device 11 shown in FIG. 1.

Functions of the display control device 10 are implemented by processing circuitry, for example. The processing circuitry can be either dedicated hardware or the processor 101 executing a program stored in the memory 102. The processor 101 can be any one of a processing device, an arithmetic device, a microprocessor, a microcomputer and a DSP (Digital Signal Processor). The memory 102 may be a storage device such as a non-transitory computer-readable storage medium (i.e., record medium) storing the program.

In the case where the processing circuitry is dedicated hardware, the processing circuitry is, for example, a single circuit, a combined circuit, a programmed processor, a parallelly programmed processor, an ASIC (Application Specific Integrated Circuit), an FPGA (Field-Programmable Gate Array) or a combination of some of these circuits.

In the case where the processing circuitry is the processor 101, the display control program to be executed by the display control device 10 is implemented by software, firmware or a combination of software and firmware. The display control program is installed in the display control device 10 via a network or from a record medium. The software and the firmware are described as programs and stored in the memory 102. The processor 101 is capable of implementing the functions of the units shown in FIG. 1 by reading out and executing the display control program stored in the memory 102.

It is also possible to implement part of the display control device 10 by dedicated hardware and part of the display control device 10 by software or firmware. As above, the processing circuitry is capable of implementing the above-described functions by hardware, software, firmware or a combination of some of these means.

Figure 3:
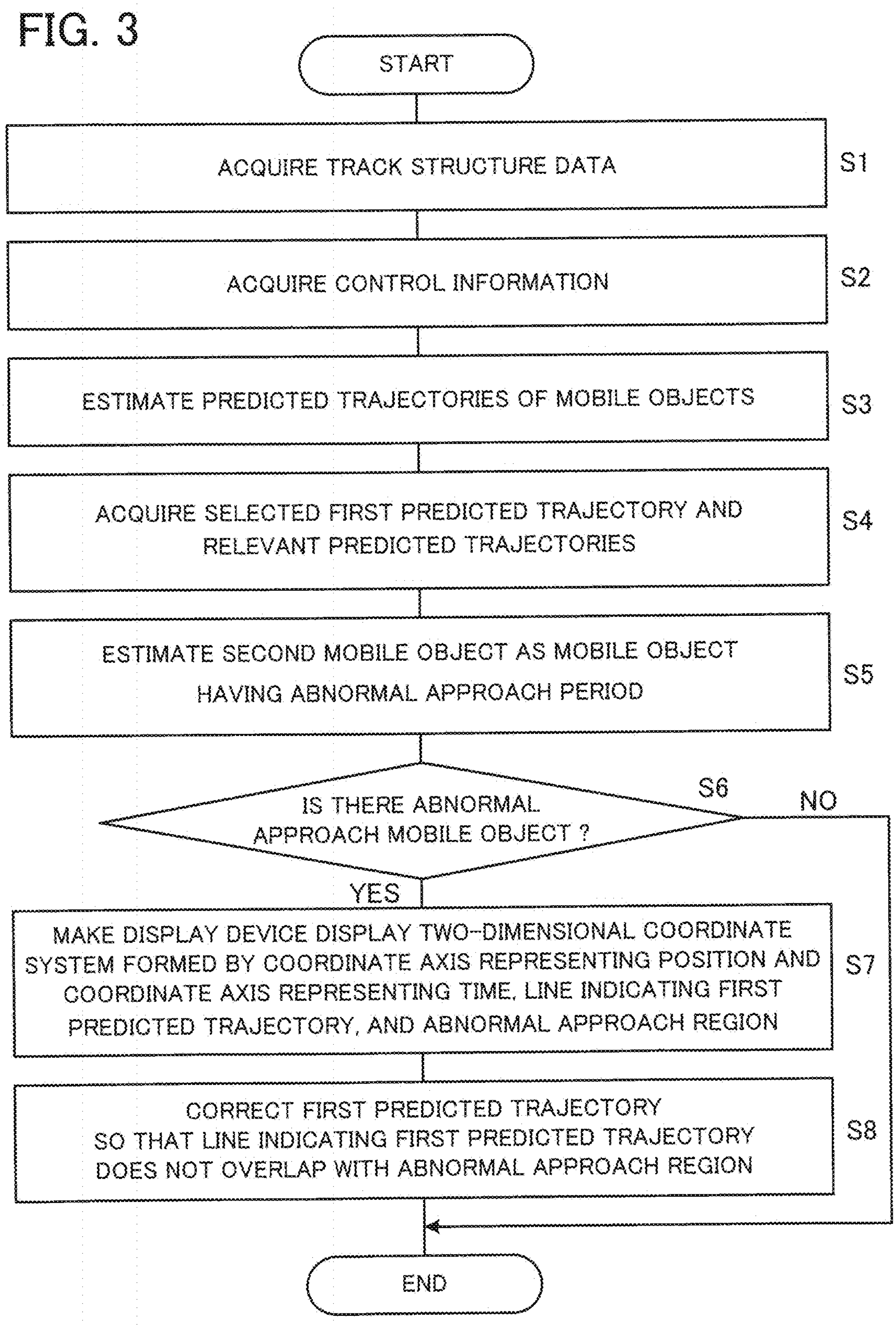
FIG. 3 is a flowchart showing a display operation of the display control device according to the embodiment.

FIG. 3 is a flowchart showing a display operation of the display control device 10. FIG. 3 shows the display control method according to the embodiment executed by the display control device 10 of the control system 1 transmitting commands to a plurality of mobile objects traveling on a plurality of tracks.

First, the display control device 10 acquires the track structure data indicating the structure of the plurality of tracks (step S1) and acquires the control information from the control information management device 30 that manages the control information including the positions and the operation schedules of the plurality of mobile objects (step S2). The steps S1 and S2 may also be executed in reverse order or executed in parallel.

The display control device 10 estimates the predicted trajectories indicating the movement routes of the plurality of mobile objects based on the track structure data and the control information (step S3).

The display control device 10 acquires the first predicted trajectory indicating the movement route of the mobile object selected as the monitoring target among the plurality of mobile objects and the plurality of second predicted trajectories indicating the movement routes of the plurality of relevant mobile objects being mobile objects other than the selected mobile object from the estimated predicted trajectories (step S4).

The display control device 10 estimates the abnormal approach mobile object as a mobile object having the period in which the distance from the selected mobile object is less than or equal to the predetermined reference value out of the plurality of relevant mobile objects and estimates the position of the abnormal approach mobile object in the abnormal approach period based on the track structure data, the first predicted trajectory and the plurality of second predicted trajectories (step S5).

When there is an abnormal approach mobile object (YES in step S6), the display control device 10 makes the display device 40 display the two-dimensional coordinate system, formed by the first coordinate axis representing the positions from the start point to the end point of the first predicted trajectory by distances from the start point (e.g., horizontal axis) and the second coordinate axis representing the time (e.g., vertical axis), and the line (e.g., straight line or curved line) indicating the first predicted trajectory in the two-dimensional coordinate system (step S7), and makes the display device 40 display the enhanced display component indicating the position of the abnormal approach mobile object in the abnormal approach period in the two-dimensional coordinate system (step S8). When there is no abnormal approach mobile object (NO in the step S6), the display control device 10 ends the execution of the display control method according to the embodiment.

Figure 4:
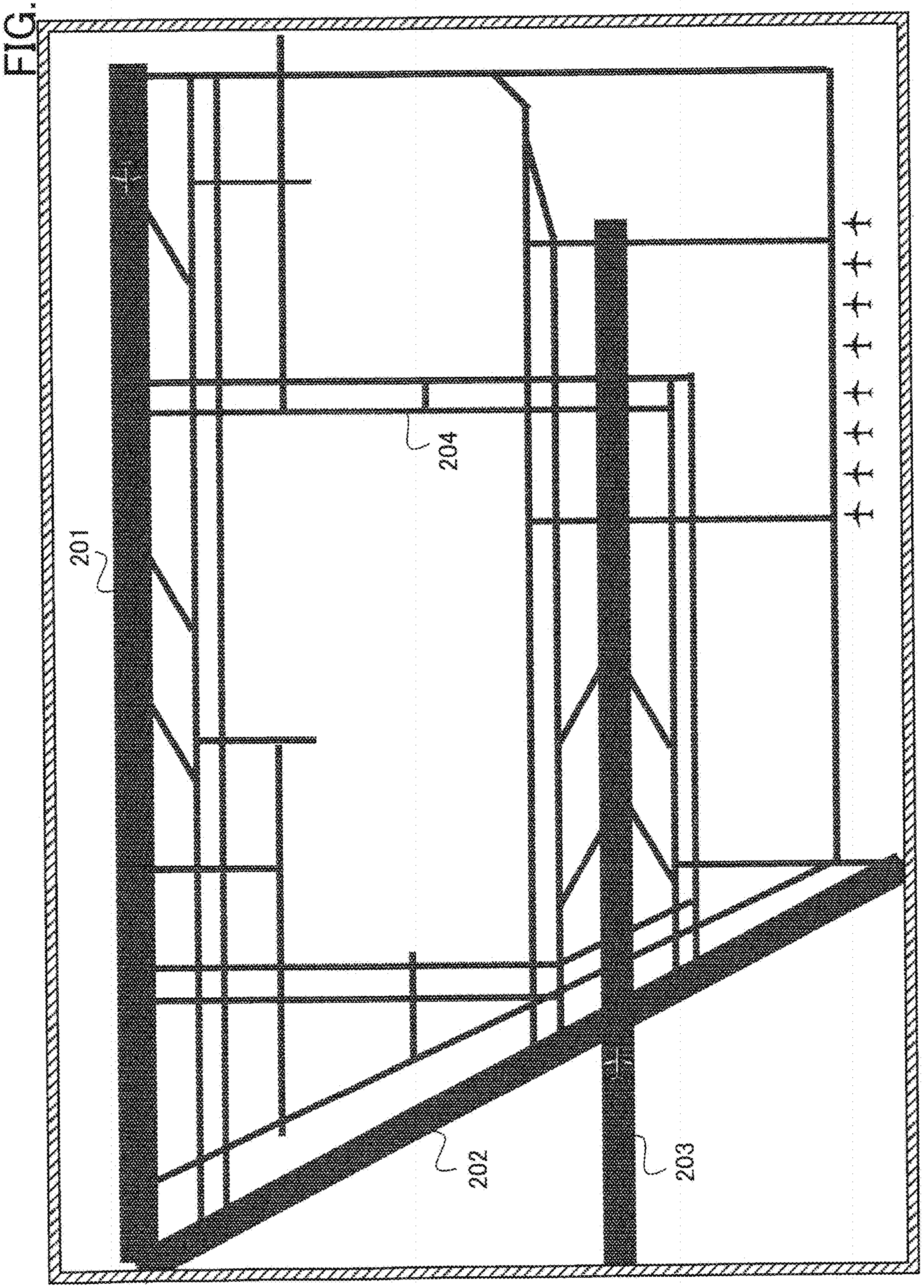
FIG. 4 is a plan view showing an example of runways and taxiways as tracks in an airport.

FIG. 4 is a plan view showing an example of runways 201 to 203 and taxiways 204 as the tracks in the airport. The runways 201 to 203 are used for the takeoff and the landing of aircraft. The taxiway 204 is a passage for the taxiing of the aircraft as the mobile objects and is mainly used for the traveling between a hardstand and a runway.

Figure 5B:
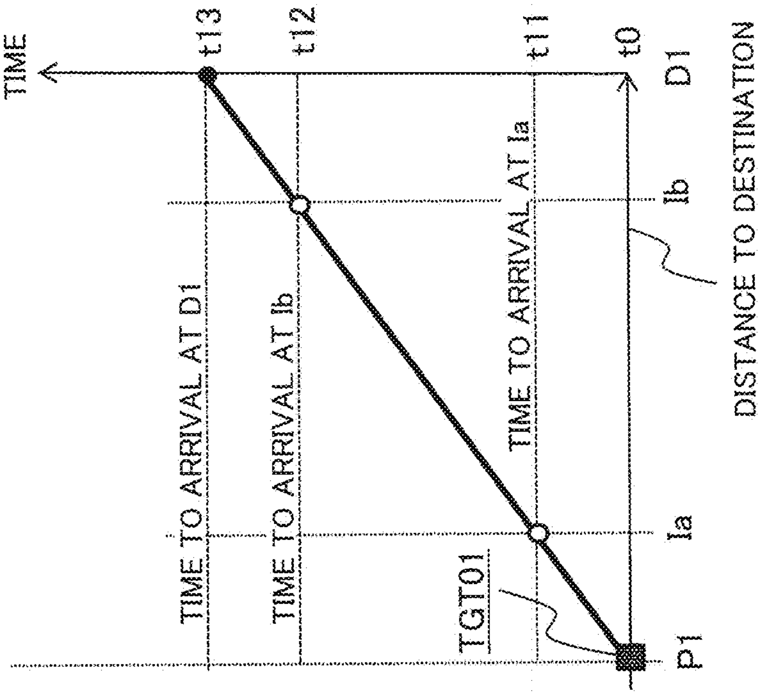
FIG. 5B is a diagram showing an example of the predicted trajectory of the selected aircraft in a two-dimensional coordinate system formed by a position coordinate axis and a time coordinate axis.
Figure 5A:
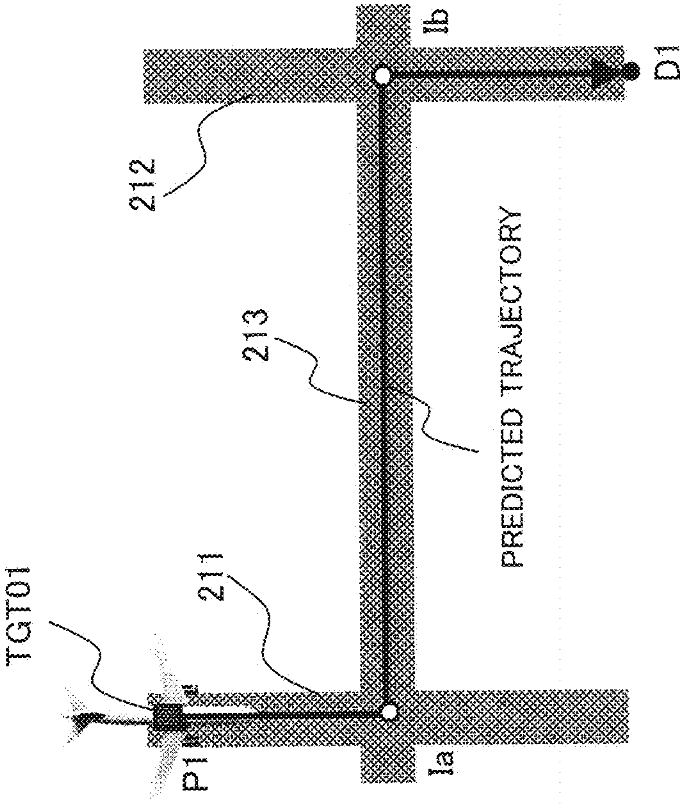
FIG. 5A is a plan view showing an example of a predicted trajectory of a selected aircraft.

FIG. 5A is a plan view showing an example of the predicted trajectory of a selected aircraft TGT01. FIG. 5B is a diagram showing an example of the predicted trajectory of the selected aircraft TGT01 in the two-dimensional coordinate system formed by the position coordinate axis and the time coordinate axis. FIG. 5A shows a taxiway 211, a taxiway 212 in parallel with the taxiway 211, and a taxiway 213 intersecting with both of the taxiways 211 and 212. A reference character Ia is assigned to an intersection of the taxiway 211 and the taxiway 213. A reference character Ib is assigned to an intersection of the taxiway 212 and the taxiway 213. FIG. 5A shows an example in which the aircraft TGT01 taxis from a start point P1 as a starting position of the movement to an end point D1 as a destination by successively passing through the intersections Ia and Ib. In FIG. 5B, the predicted trajectory (predicted locus) in the example in which the aircraft TGT01 taxis from the start point P1 as the starting position of the movement (time t0) to the end point D1 as the destination (time t13) by successively passing through the intersections Ia and Ib (time t11, time t12) is shown in the two-dimensional coordinate system as a straight line. The times t11, t12 and t13 represent elapsed times since the time t0. The predicted trajectory is not limited to a straight line but can also be a curved line, a combination of a curved line and a straight line, a combination of a plurality of straight lines with different gradients, or the like. The predicted trajectory and a mark (quadrangular mark in this example) indicating the position of the aircraft TGT01 and displayed in superimposition on the predicted trajectory are shown in FIG. 5B.

Figure 6A:
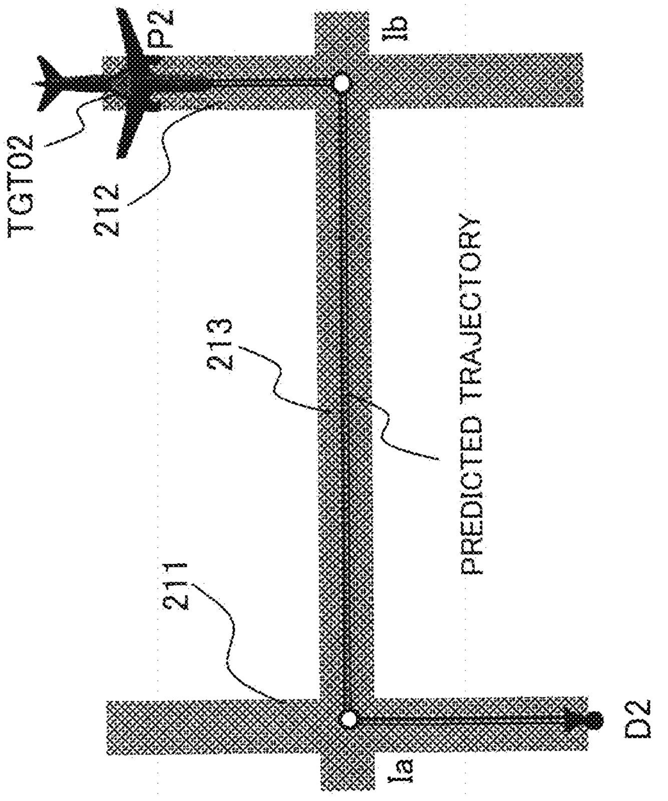
FIG. 6A is a plan view showing an example of a predicted trajectory of a relevant aircraft.
Figure 6B:
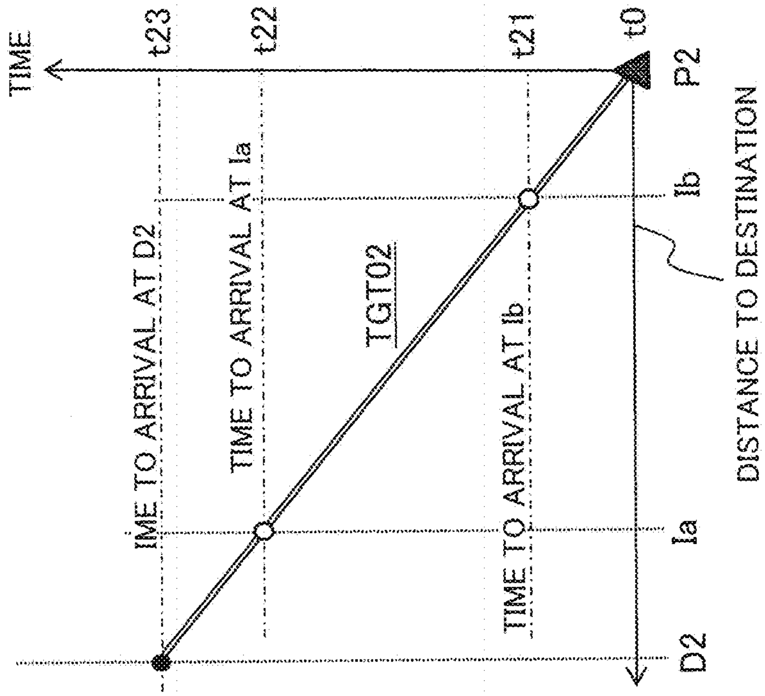
FIG. 6B is a diagram showing an example of the predicted trajectory of the relevant aircraft in the two-dimensional coordinate system formed by the position coordinate axis and the time coordinate axis.

FIG. 6A is a plan view showing an example of the predicted trajectory of an aircraft TGT02 relevant to the selected aircraft TGT01. FIG. 6B is a diagram showing an example of the predicted trajectory of the aircraft TGT02 in the two-dimensional coordinate system formed by the position coordinate axis and the time coordinate axis. FIG. 6A shows an example in which the aircraft TGT02 taxis from a start point P2 as a starting position of the movement to an end point D2 as a destination by successively passing through the intersections Ib and Ia. In FIG. 6B, the example in which the aircraft TGT01 taxis from the start point P2 as the starting position of the movement (time t0) to the end point D2 as the destination (time t23) by successively passing through the intersections Ib and Ia (time t21, time t22) is shown in the two-dimensional coordinate system as a straight line. The times t21, t22 and t23 represent elapsed times since the time t0. The predicted trajectory is not limited to a straight line but can also be a curved line, a combination of a curved line and a straight line, a combination of a plurality of straight lines with different gradients, or the like. The predicted trajectory and a mark (triangular mark in this example) indicating the position of the aircraft TGT02 and displayed in superimposition on the predicted trajectory are shown in FIG. 6B.

Figure 7B:
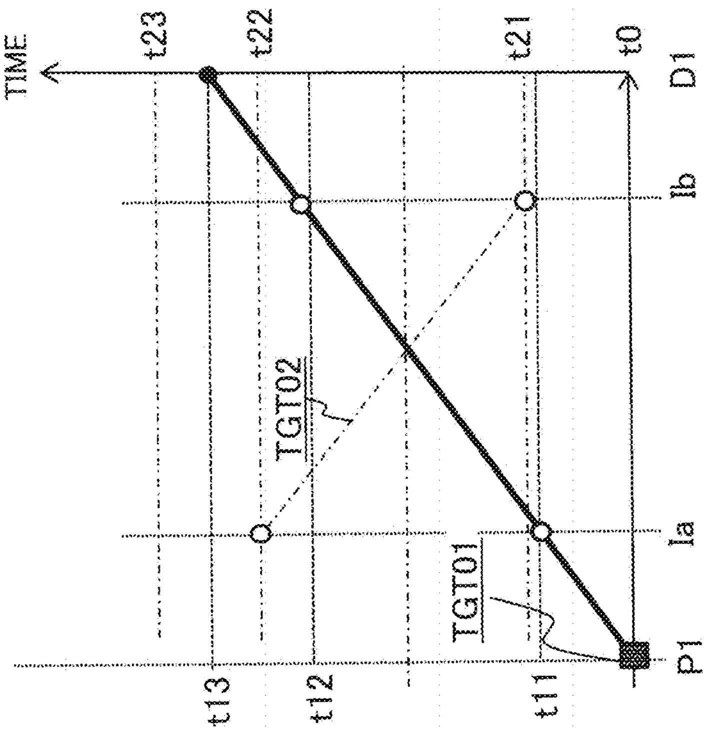
FIG. 7B is a diagram showing an example of indicating the position of the abnormal approach between the selected aircraft and the aircraft relevant to the selected aircraft in the two-dimensional coordinate system.
Figure 7A:
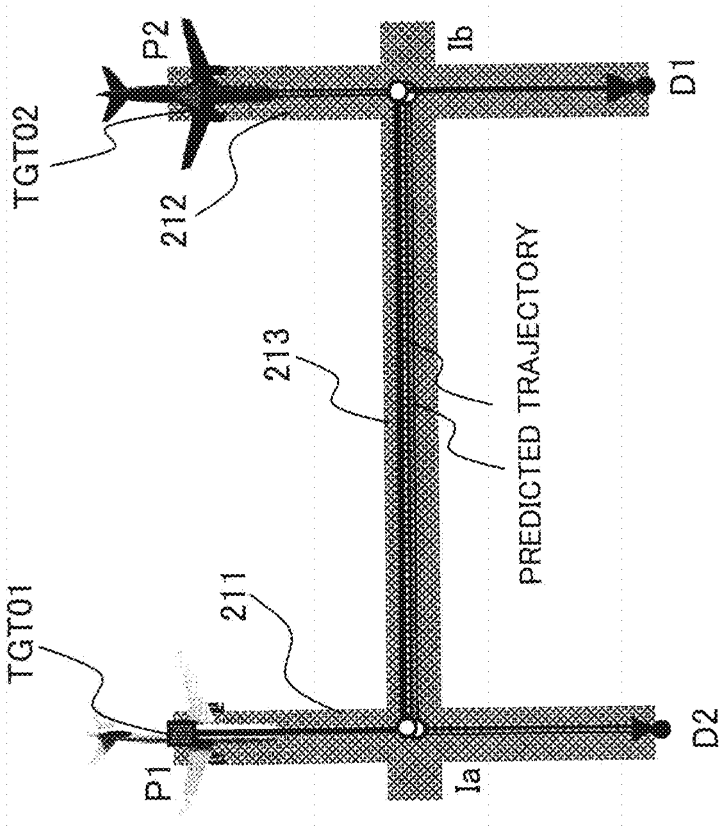
FIG. 7A is a plan view showing an example of a predicted trajectories in a situation where the selected aircraft and an aircraft relevant to the selected aircraft travel in directions of approaching each other on the same taxiway.

FIG. 7A is a plan view showing an example of the predicted trajectories in a situation where the selected aircraft TGT01 and the relevant aircraft TGT02 travel in directions of approaching each other on the same taxiway 213 (when head-on approach occurs, namely, in a situation where a head-on collision can occur). FIG. 7B is a diagram showing an example of indicating the position of the abnormal approach between the selected aircraft TGT01 and the relevant aircraft TGT02 in the two-dimensional coordinate system.

Figure 8B:
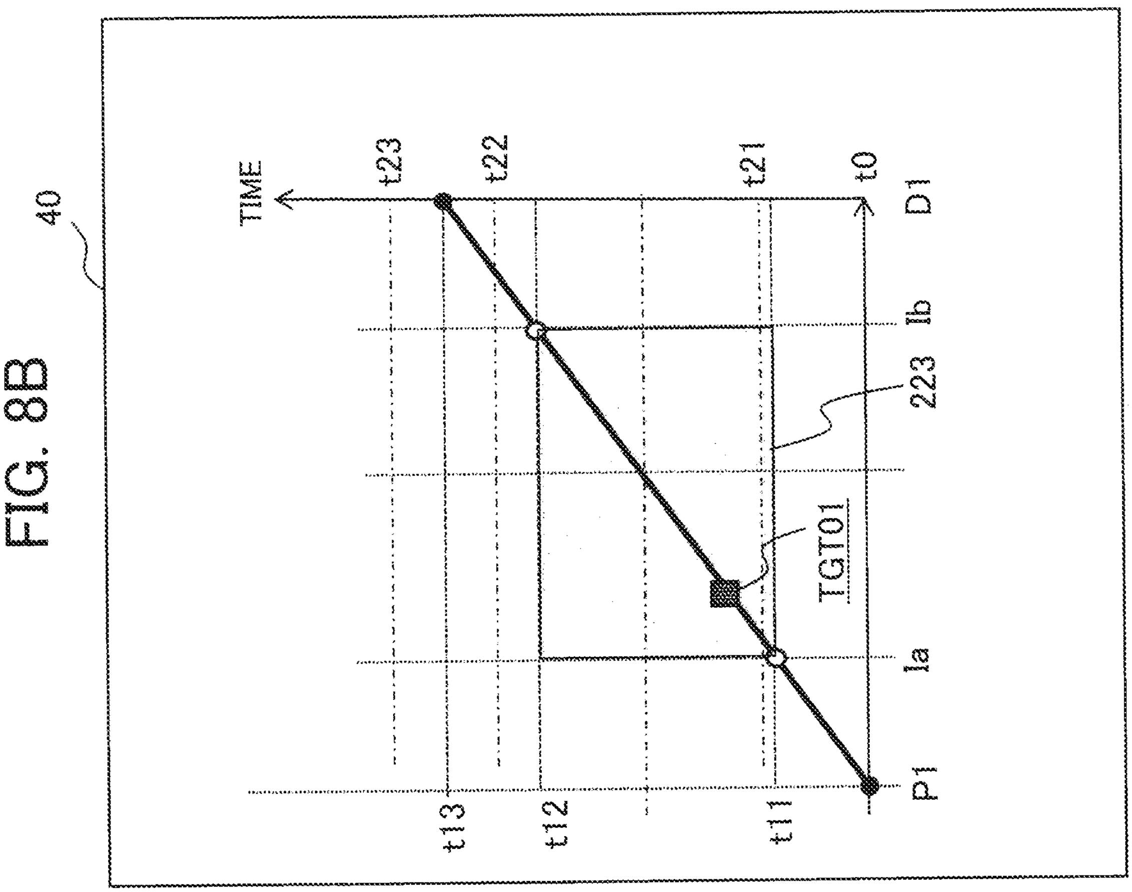
FIG. 8B is a diagram showing a display example of a display device at the time of the occurrence of head-on approach in FIG. 8A.
Figure 8A:
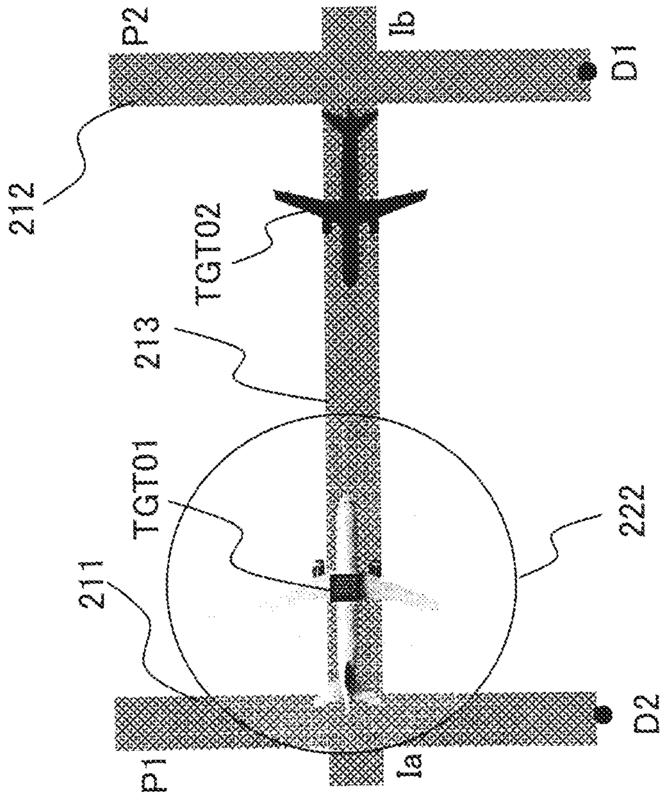
FIG. 8A is a plan view showing an example in which the selected aircraft and the aircraft relevant to the selected aircraft started traveling in the directions of approaching each other on the same taxiway.

FIG. 8A is a plan view showing an example in which the selected aircraft TGT01 and the aircraft TGT02 relevant to the selected aircraft TGT01 started traveling in the directions of approaching each other on the same taxiway 213. FIG. 8B is a diagram showing a display example of the display device 40 at the time of the occurrence of the head-on approach in FIG. 8A. As shown in FIG. 8B, when there are two aircraft TGT01 and TGT02 that started traveling in the directions of approaching each other on the same taxiway 213, a head-on region 223 as a region in which a head-on collision can occur (region including a section between the intersections Ia and Ib in the taxiway 213) is designated as an enhanced region to be filled in with a color representing the head-on region 223 (e.g., predetermined color). The enhanced region is a region that is displayed in enhanced display so as to draw attention of an observer. The method of displaying the enhanced region is not limited to the filling in with color but can also be variation in the color, variation in the luminance, variation in the pattern, a combination of two or more of these methods, or the like.

Figure 9B:
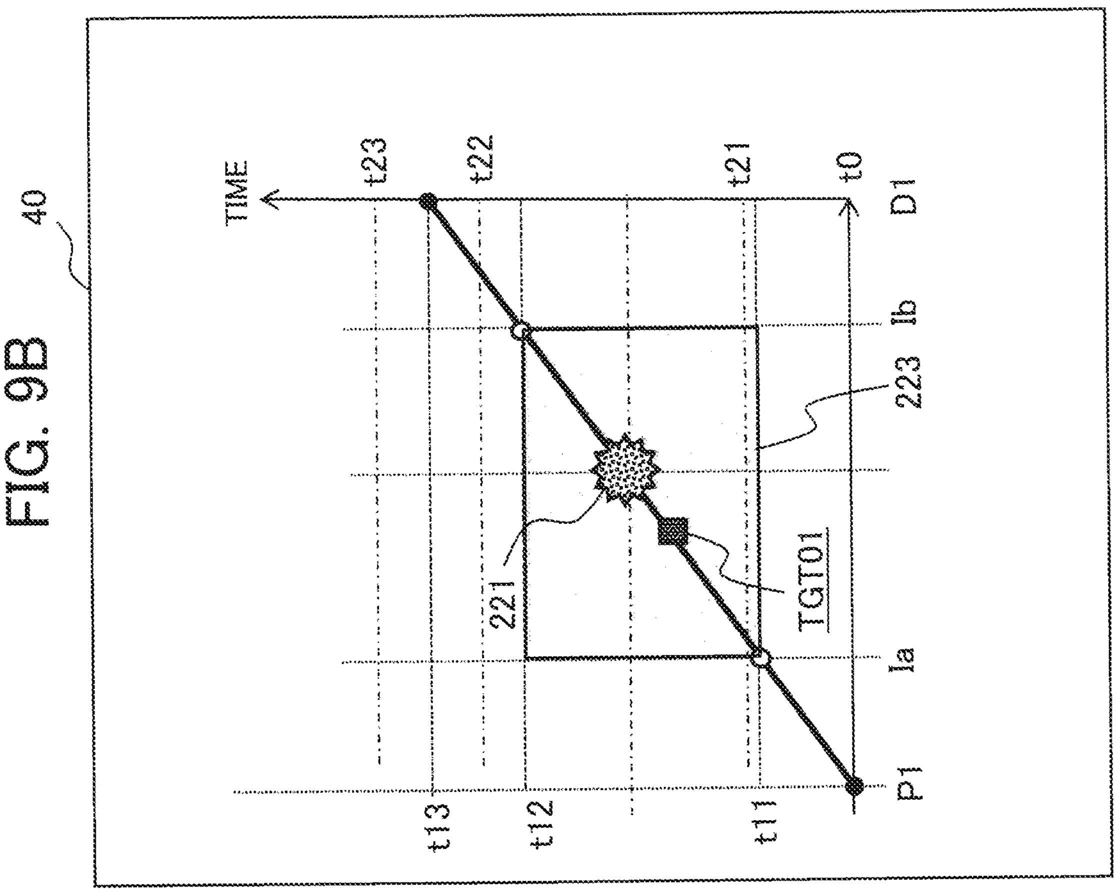
FIG. 9B is a diagram showing a display example of the display device at the time of the occurrence of the abnormal approach situation in FIG. 9A.
Figure 9A:
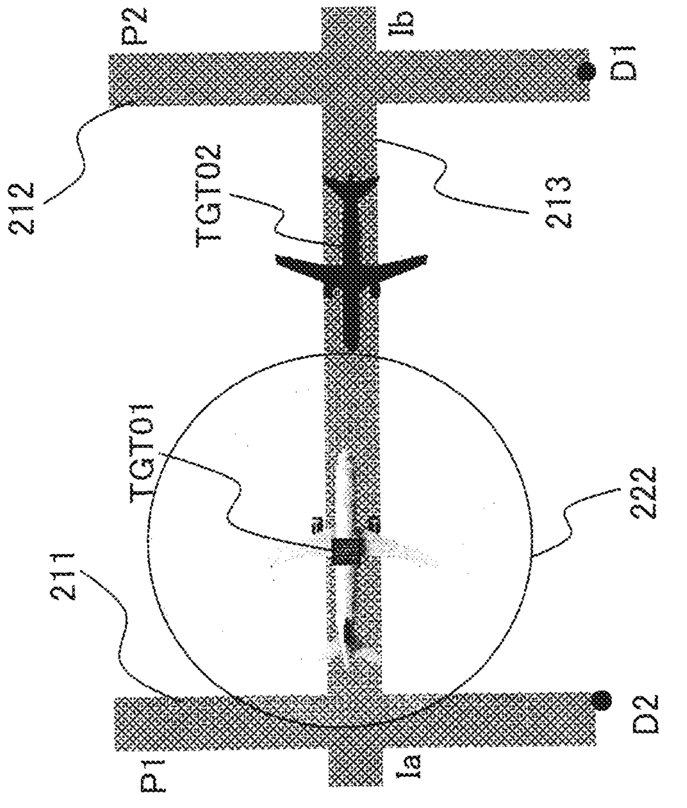
FIG. 9A is a plan view showing an abnormal approach situation as a situation where the selected aircraft and the aircraft relevant to the selected aircraft traveled in the directions of approaching each other on the same taxiway and the relevant aircraft has entered an abnormal approach range of the selected aircraft.

FIG. 9A is a plan view showing an abnormal approach situation as a situation where the selected aircraft TGT01 and the aircraft TGT02 relevant to the selected aircraft TGT01 traveled in the directions of approaching each other on the same taxiway 213 and the aircraft TGT02 has entered an abnormal approach range 222 of the aircraft TGT01. FIG. 9B is a diagram showing a display example of the display device 40 at the time of the occurrence of the abnormal approach situation in FIG. 9A. As shown in FIG. 9B, when there are two aircraft traveling in the directions of approaching each other on the same taxiway 213 and the aircraft TGT02 has entered the abnormal approach range 222 of the aircraft TGT01, the display control device 10 makes the display device 40 display an enhanced display component 221 at the position of the aircraft TGT02 relevant to the selected aircraft TGT01 at the time of the occurrence of the abnormal approach in addition to the display of the head-on region 223. FIG. 9B corresponds to the state of the step S8 in FIG. 3.

Figure 10B:
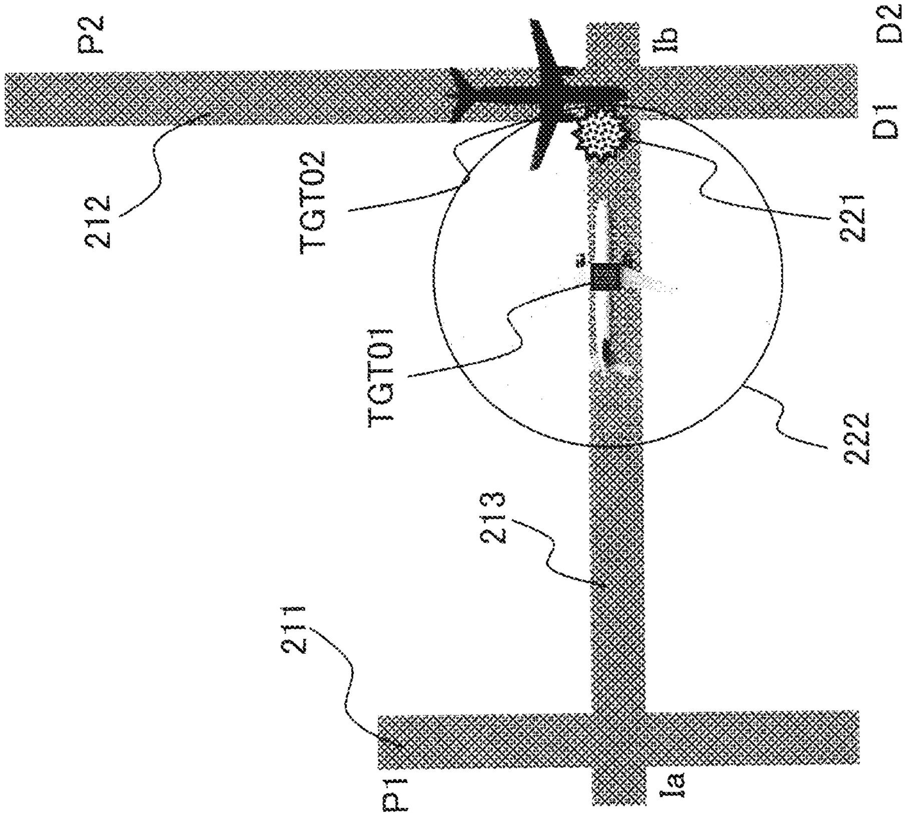
FIG. 10B is a diagram showing the two-dimensional coordinate system and an example of an enhanced display component at the time of the occurrence of the abnormal approach in FIG. 10A.
Figure 10A:
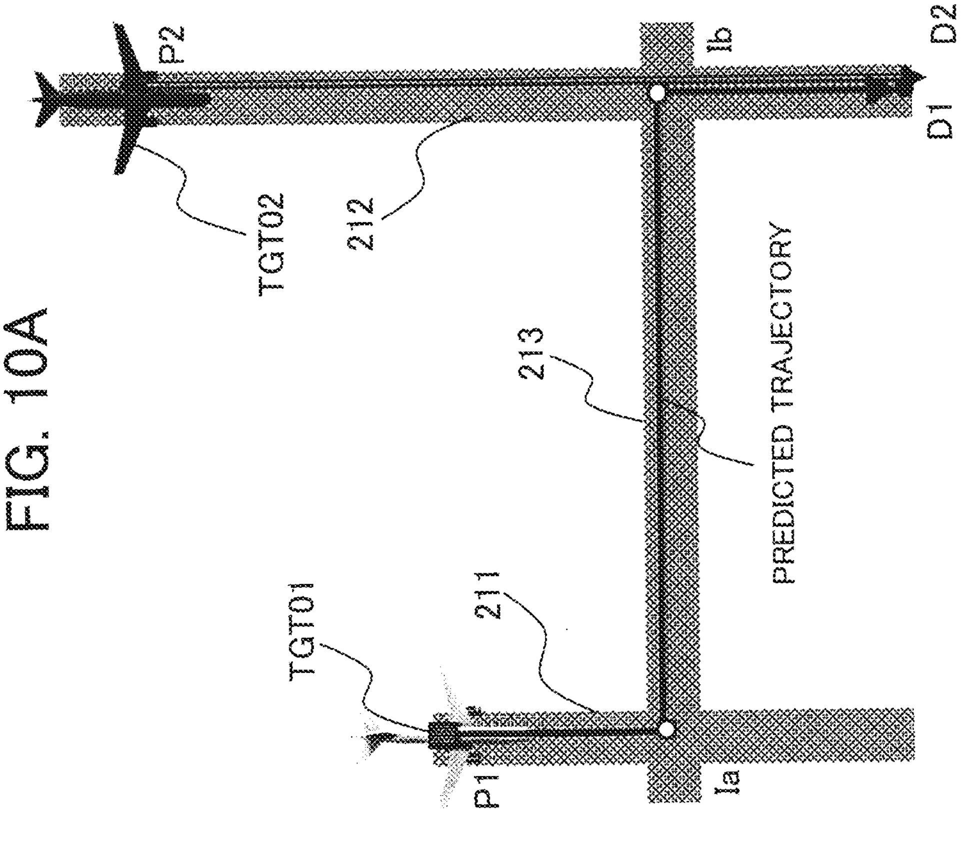
FIG. 10A is a plan view showing an example of abnormal approach (danger of collision in this example) of the selected aircraft and the aircraft relevant to the selected aircraft at an intersection.
Figure 11:
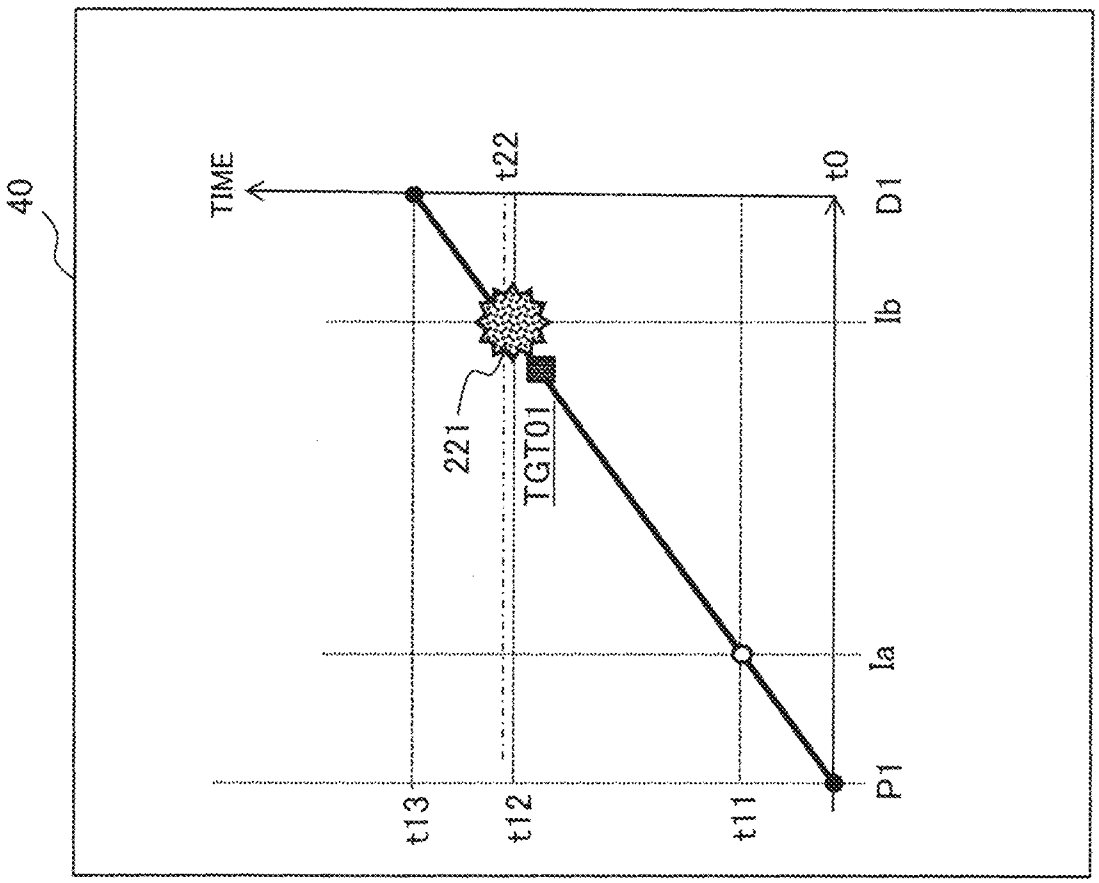
FIG. 11 is a diagram showing a display example at the time of the occurrence of the abnormal approach in FIG. 10B (danger of collision at the intersection in this example)

FIG. 10A is a plan view showing the predicted trajectories of the selected aircraft TGT01 and the relevant aircraft TGT02. FIG. 10B is a plan view showing an example of occurrence of the abnormal approach (danger of collision in this example) of the selected aircraft TGT01 and the relevant aircraft TGT02 at an intersection. FIG. 11 is a diagram showing a display example at the time of the occurrence of the abnormal approach in FIG. 10B (danger of collision at the intersection in this example). FIG. 10A shows an example in which the aircraft TGT01 taxis from the start point P1 as the starting position of the movement to the end point D1 as the destination by successively passing through the intersections Ia and Ib. Further, FIG. 10A shows an example in which the aircraft TGT02 taxis from a start point P2 as the starting position of the movement to an end point D2 as the destination by successively passing through the intersections Ib and Ia. In FIG. 11, the example in which the aircraft TGT01 taxis from the start point P1 as the starting position of the movement (time t0) to the end point D1 as the destination by successively passing through the intersections Ia and Ib is shown in the two-dimensional coordinate system as a straight line. As shown in FIG. 11, the display device 40 is made to display the enhanced display component 221 at the position of the aircraft TGT02 relevant to the selected aircraft TGT01 at the time of the occurrence of the abnormal approach. FIG. 11 corresponds to the state of the step S8 in FIG. 3.

Figure 12A:
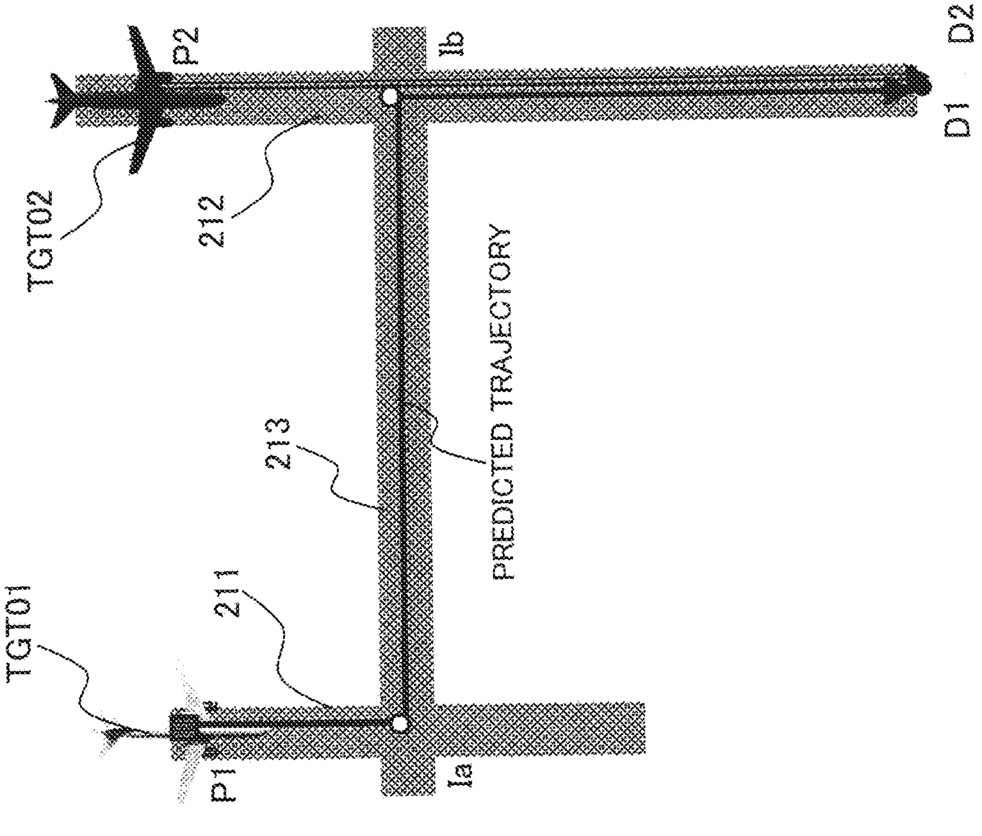
FIG. 12A is a plan view showing an example of the predicted trajectory of the selected aircraft and an example of the predicted trajectory of the relevant aircraft.
Figure 12B:
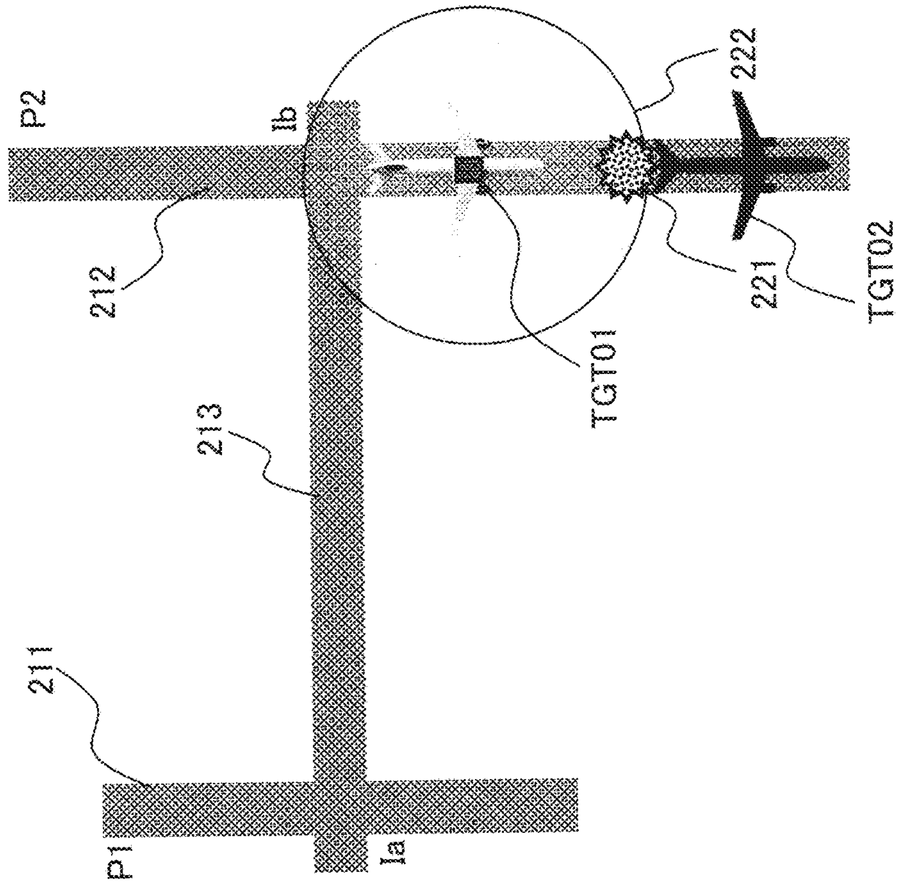
FIG. 12B is a plan view showing an example in which the selected aircraft and the aircraft relevant to the selected aircraft travel in the same direction on the same taxiway.
Figure 13:
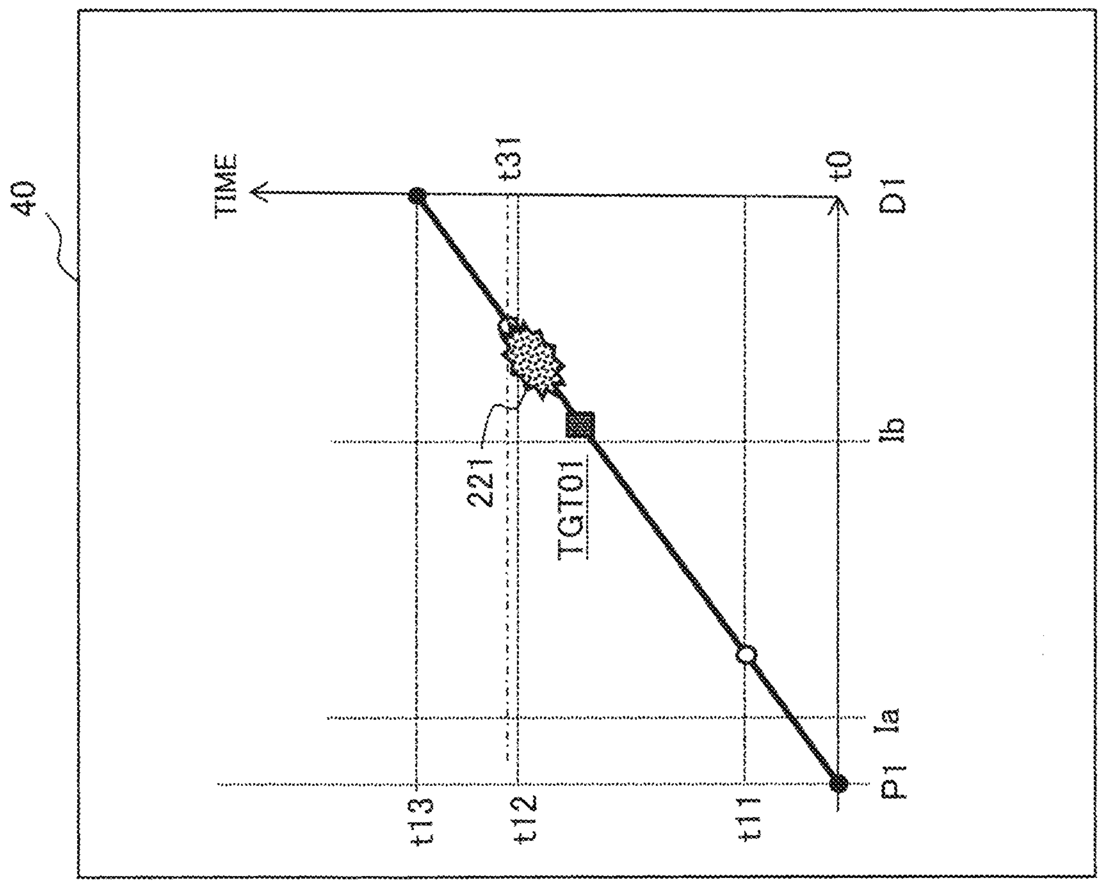
FIG. 13 is a diagram showing a display example at the time of the occurrence of the abnormal approach in FIG. 12B (danger of rear-end collision in this example)

FIG. 12A is a plan view showing the predicted trajectories of the selected aircraft TGT01 and the relevant aircraft TGT02. FIG. 12B is a plan view showing an example of occurrence of an abnormal approach (danger of rear-end collision in this example) of the selected aircraft TGT01 and the relevant aircraft TGT02 on the taxiway 212. FIG. 13 is a diagram showing a display example at the time of the occurrence of the abnormal approach in FIG. 12B (danger of rear-end collision at an intersection in this example). FIG. 12A shows an example in which the aircraft TGT01 taxis from a start point P1 as the starting position of the movement to an end point D1 as the destination by successively passing through the intersections Ia and Ib. Further, FIG. 12A shows an example in which the aircraft TGT02 taxis from a start point P2 as the starting position of the movement to an end point D2 as the destination by passing through the intersection Ib. In FIG. 13 the example in which the aircraft TGT01 taxis from the start point P1 as the starting position of the movement (time t0) to the end point D1 as the destination by successively passing through the intersections Ia and Ib is shown in the two-dimensional coordinate system as a straight line. As shown in FIG. 13, the display device 40 is made to display the enhanced display component 221 at the position of the aircraft TGT02 relevant to the selected aircraft TGT01 at the time of the occurrence of the abnormal approach. FIG. 13 corresponds to the state of the step S8 in FIG. 3.

Figure 14B:
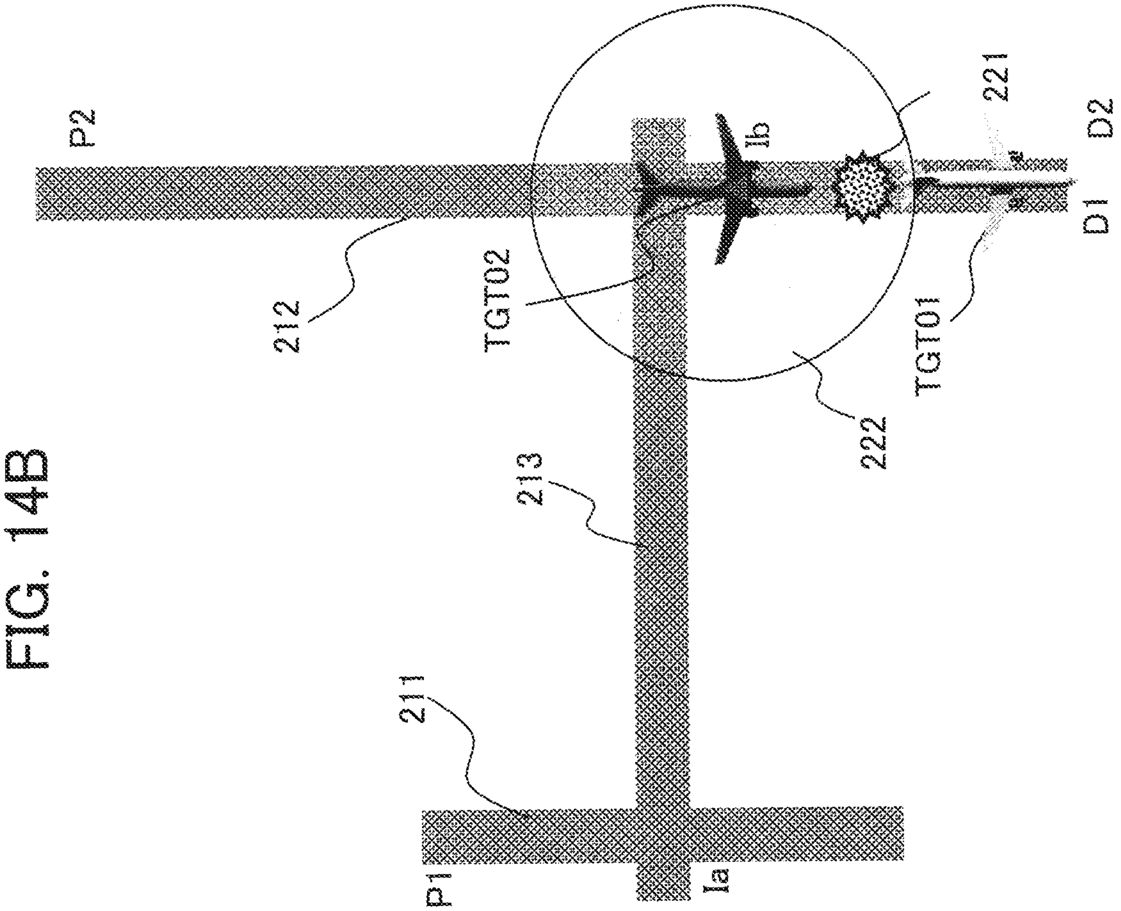
FIG. 14B is a plan view showing an example in which the selected aircraft and the aircraft relevant to the selected aircraft travel in the same direction on the same taxiway.
Figure 14A:
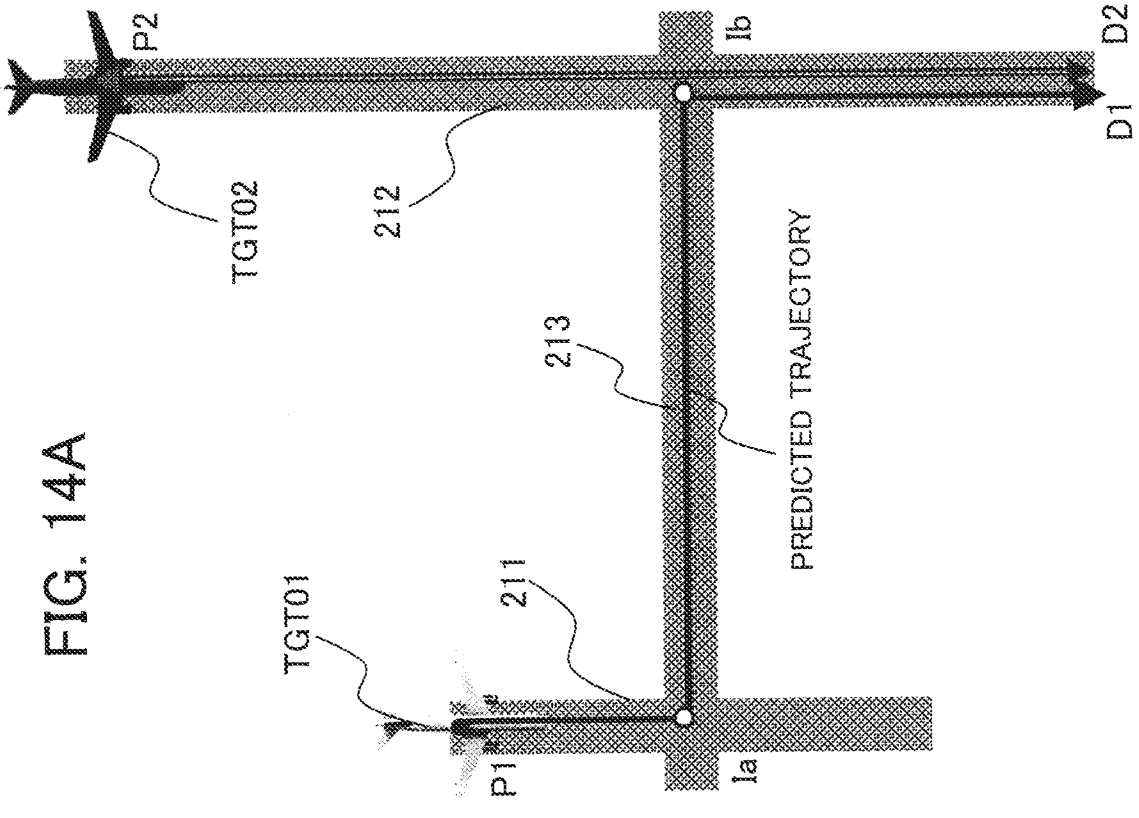
FIG. 14A is a plan view showing an example of the predicted trajectory of a selected aircraft and an example of the predicted trajectory of a relevant aircraft.
Figure 15:
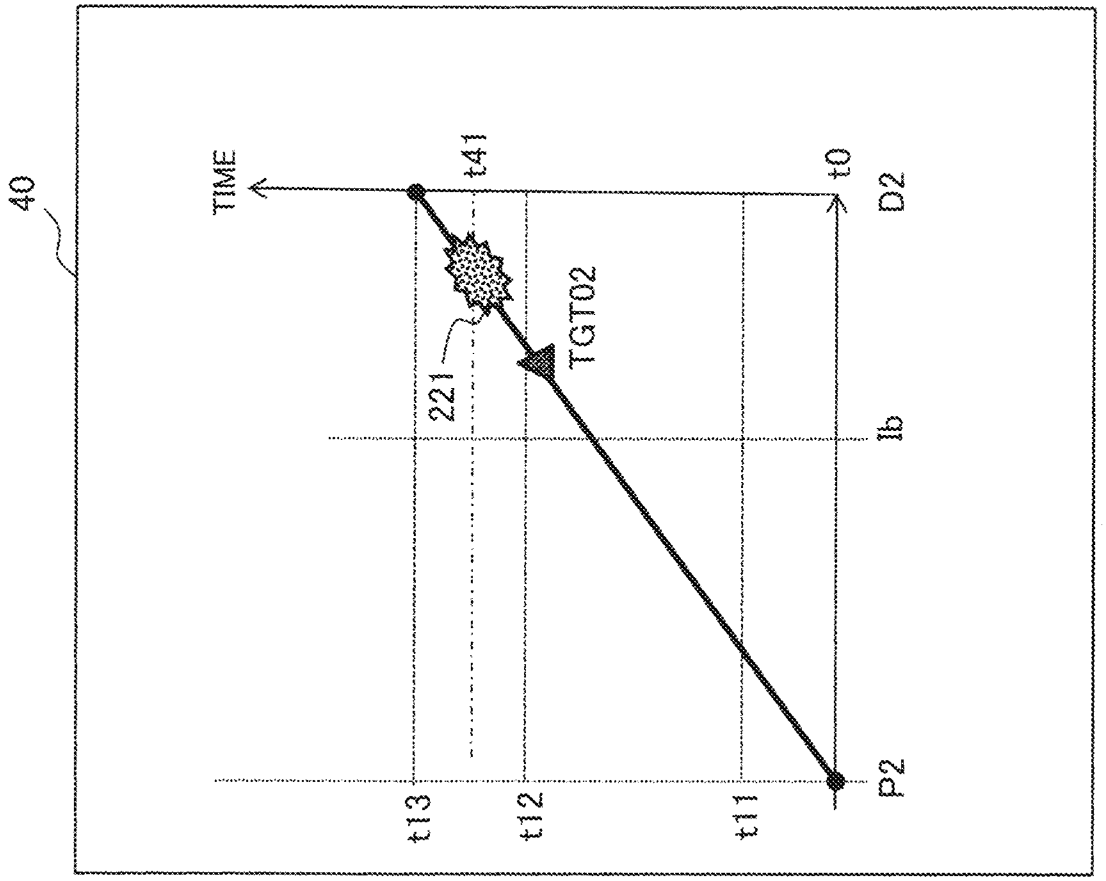
FIG. 15 is a diagram showing a display example at the time of the occurrence of the abnormal approach in FIG. 14B (danger of rear-end collision in this example)

FIG. 14A is a plan view showing the predicted trajectories of a selected aircraft TGT02 and an aircraft TGT01 relevant to the selected aircraft TGT02. FIG. 14B is a plan view showing an example of occurrence of an abnormal approach (danger of rear-end collision in this example) of the selected aircraft TGT02 and the aircraft TGT01 relevant to the selected aircraft TGT02 on the taxiway 212. FIG. 15 is a diagram showing a display example at the time of the occurrence of the abnormal approach in FIG. 14B (danger of rear-end collision in this example). FIG. 14A shows an example in which the aircraft TGT01 taxis from a start point P1 as the starting position of the movement to an end point D1 as the destination by successively passing through the intersections Ia and Ib and the aircraft TGT02 taxis from a start point P2 as the starting position of the movement to an end point D2 as the destination by traveling forward through the intersection Ib. Further, FIG. 14B shows the example in which the aircraft TGT02 taxis from the start point P2 as the starting position of the movement to the end point D2 as the destination via the intersection Ib. In FIG. 15, the example in which the aircraft TGT02 taxis from the start point P2 as the starting position of the movement (time t0) to the end point D2 as the destination via the intersection Ib is shown in the two-dimensional coordinate system as a straight line. As shown in FIG. 15, the display device 40 is made to display the enhanced display component 221 at the position of the aircraft TGT01 relevant to the selected aircraft TGT02 at the time of the occurrence of the abnormal approach. FIG. 15 corresponds to the state of the step S8 in FIG. 3.

Figure 16:
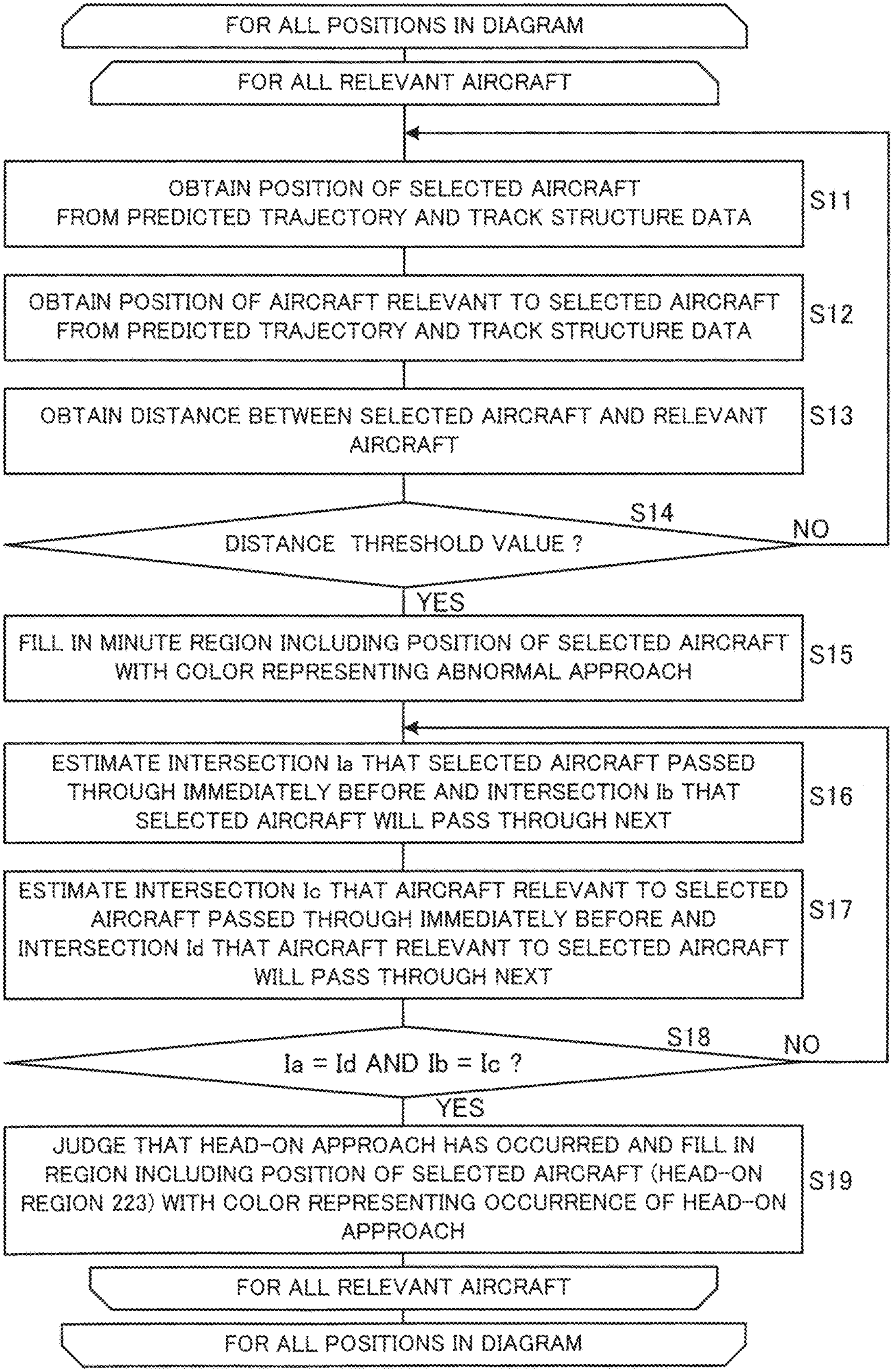
FIG. 16 is a flowchart showing a drawing process of the display control device according to the embodiment.

FIG. 16 is a flowchart showing a drawing process of the display control device 10 according to the embodiment. First, the display control device 10 obtains the position of the selected aircraft from the predicted trajectory of the selected aircraft and the acquired track structure data (step S11). Subsequently, the display control device 10 obtains the position of an aircraft relevant to the selected aircraft from the predicted trajectory of the relevant aircraft and the acquired track structure data (step S12). The steps S11 and S12 may also be executed in reverse order or executed in parallel.

The display control device 10 obtains the distance between the selected aircraft and the aircraft relevant to the selected aircraft (step S13) and judges whether or not the obtained distance is less than or equal to a predetermined reference value (i.e., threshold value) (step S14). If the obtained distance is greater than the predetermined threshold value (NO in the step S14), the process returns to the step S11. If the obtained distance is less than or equal to the predetermined threshold value (YES in the step S14), the process advances to step S15.

In the step S15, the display control device 10 fills in a minute region including the position of the selected aircraft with a color representing the abnormal approach (e.g., danger of collision at an intersection, rear-end collision or head-on collision). The minute region is a region in predetermined size and shape, for example. The size of the minute region is specified by the number of pixels in each of a vertical direction and a horizontal direction, for example. The shape of the minute region is a quadrangular shape, a circular shape, an elliptical shape, a triangular shape or the like, for example. By the processing of the steps S11 to S15, a color, luminance, a pattern, or a combination of two or more out of these for displaying the abnormal approach may be assigned to one minute region regarding one relevant aircraft.

Subsequently, the display control device 10 estimates an intersection Ia that the selected aircraft passed through immediately before and an intersection Ib that the selected aircraft will pass through next (step S16). Subsequently, the display control device 10 estimates an intersection Ic that the aircraft relevant to the selected aircraft passed through immediately before and an intersection Id that the aircraft relevant to the selected aircraft will pass through next (step S17). The display control device 10 judges whether or not Ia=Id and Ib=Ic hold (step S18).

If the condition Ia=Id and Ib=Ic is not satisfied (NO in the step S18), the process returns to the step S16. If the condition Ia=Id and Ib=Ic is satisfied (YES in the step S18), the process advances to step S19. In the step S19, the display control device 10 judges that the head-on approach has occurred between the selected aircraft and the aircraft relevant to the selected aircraft and fills in the head-on region with a predetermined color.

The processing of the steps S11 to S19 is executed for all of the relevant aircraft. Further, this process is executed for all positions in the diagram. In other words, one minute region including the position of the abnormal approach is filled in with color by the processing of the steps S11 to S15 in FIG. 16, and one minute region including the position of the head-on approach is filled in with color by the processing of the steps S16 to S19.

In this embodiment, the occurrence of the abnormal approach between the selected mobile object and a mobile object relevant to the selected mobile object is displayed by using the predicted trajectory, the enhanced display component 221 and the head-on region 223 (when the head-on approach occurs) in the two-dimensional coordinate system. When the two-dimensional display is used as above, the air traffic controller is facilitated to grasp the occurrence of the abnormal approach, the position of the abnormal approach, and the type (intersection, rear-end or head-on) of the abnormal approach.

Further, by simultaneously displaying the presence/absence of the abnormal approach between the selected mobile object and a plurality of relevant mobile objects, it is possible to simultaneously grasp whether the trajectory set for each mobile object is safe or not.

Next, a description will be given of the correction of the trajectory by using diagram screens. FIGS. 17A to 17D are diagrams showing the diagram screens at the time of the correction of the trajectory by the display control device 10 according to the embodiment.

Figure 17A:
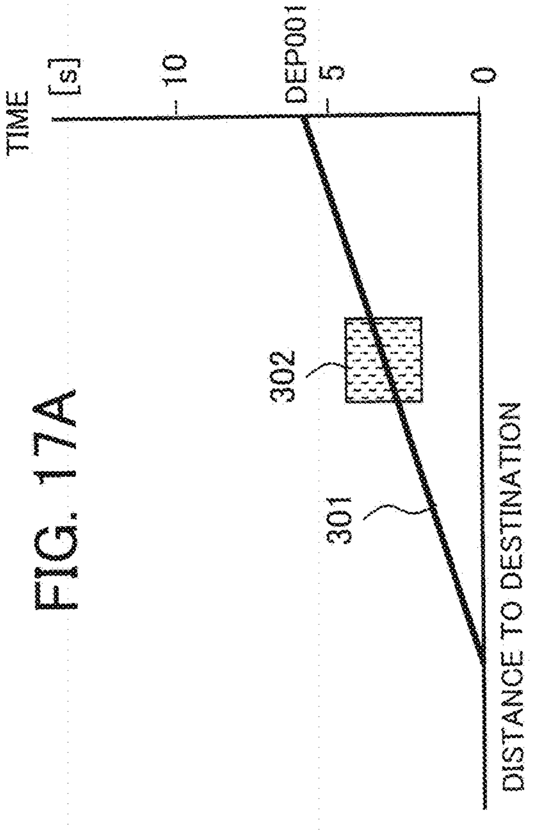
FIGS. 17A to 17D are diagrams showing diagram screens at the time of correction of the trajectory by the display control device according to the embodiment.

FIG. 17A shows a diagram screen displayed when the display control unit 17 makes the display device 40 display the two-dimensional coordinate system, formed by the first coordinate axis representing the positions from the start point (time=0) to the end point of the first predicted trajectory of the aircraft DEP001 by distances from the start point or the end point (horizontal axis) and the second coordinate axis representing the time (vertical axis), a line (straight line in FIG. 17A) 301 indicating the first predicted trajectory in the two-dimensional coordinate system, and an abnormal approach region 302 indicating the ranges of the time and the position of the second mobile object in the abnormal approach period.

Figure 17B:
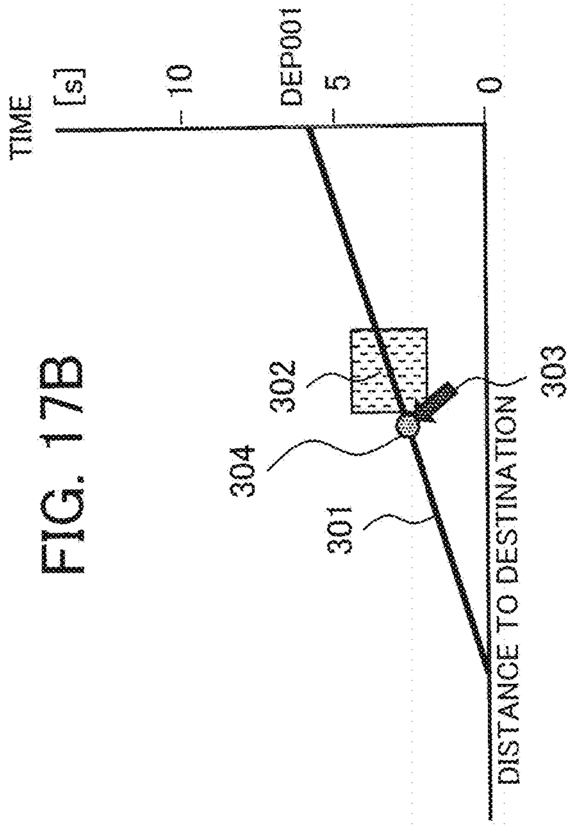

FIG. 17B shows a state in which a "knob 304" as the dot-like component (i.e., display component), overlapping with the line 301 indicating the first predicted trajectory and not overlapping with the abnormal approach region 302, is displayed at a position temporally before the abnormal approach region 302 when the trajectory correction unit 19 receives input information for moving a cursor 303 onto the line 301 indicating the first predicted trajectory of the aircraft DEP001. The input information for moving the cursor 303 is inputted by a user operation such as an operation on a mouse or the like or a touch operation on a touch panel, for example. However, it is also possible to automatically display the cursor 303 at a position temporally before the abnormal approach region 302.

Figure 17C:
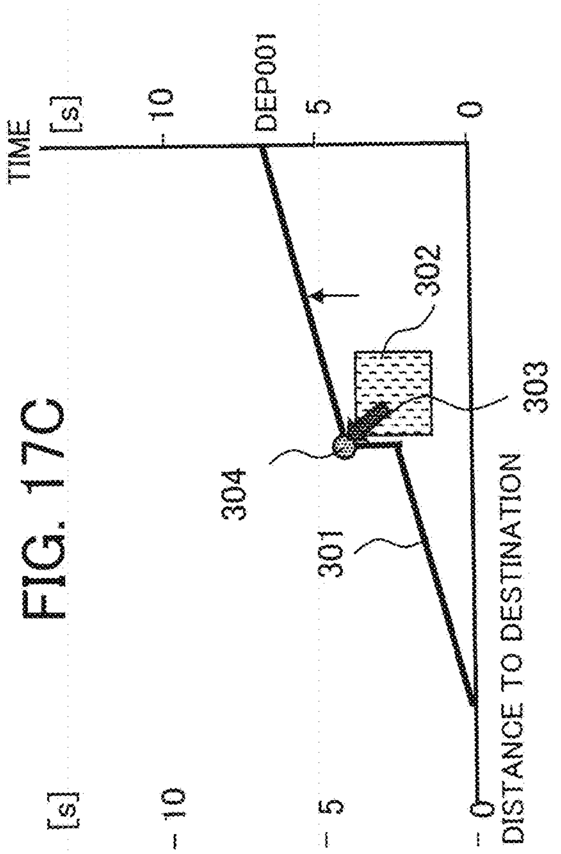

FIG. 17C shows a state in which a corrected predicted trajectory is generated by the trajectory correction unit 19 by moving part of the line 301 indicating the first predicted trajectory of the aircraft DEP001 temporally after the "knob 304" in a moving direction of the "knob 304" (upward in FIG. 17C) by a distance equal to a moving distance of the "knob 304" when the "knob 304" is moved in the time axis direction (positive direction) by a user operation.

Figure 17D:
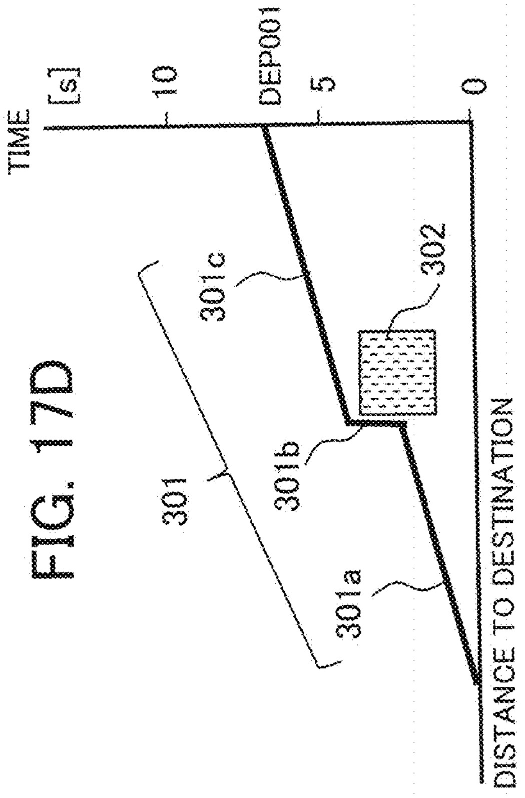

FIG. 17D shows the line 301 indicating the corrected predicted trajectory after the "knob 304" is moved in the time axis direction (positive direction). The line 301 indicating the corrected predicted trajectory is made up of a first part 301*a* as a line segment in a range temporally before the "knob 304", a third part 301*c* as a line segment in a range temporally after the "knob 304", and a second part 301*b* as a line segment connecting the first part 301*a* and the third part 301*c*.

When the predicted trajectory is not corrected by use of the "knob 304", the aircraft DEP001 as the mobile object moving according to the line 301 travels through the abnormal approach region 302 where the abnormal approach (that can include collision) with another aircraft occurs as shown in FIG. 17B. However, when the predicted trajectory has been corrected by use of the "knob 304", the aircraft DEP001 as the mobile object moving according to the line 301 remains stopped until the time of the second part 301*b* passes as shown in FIG. 17D, and thus does not travel through the abnormal approach region 302.

Figure 18:
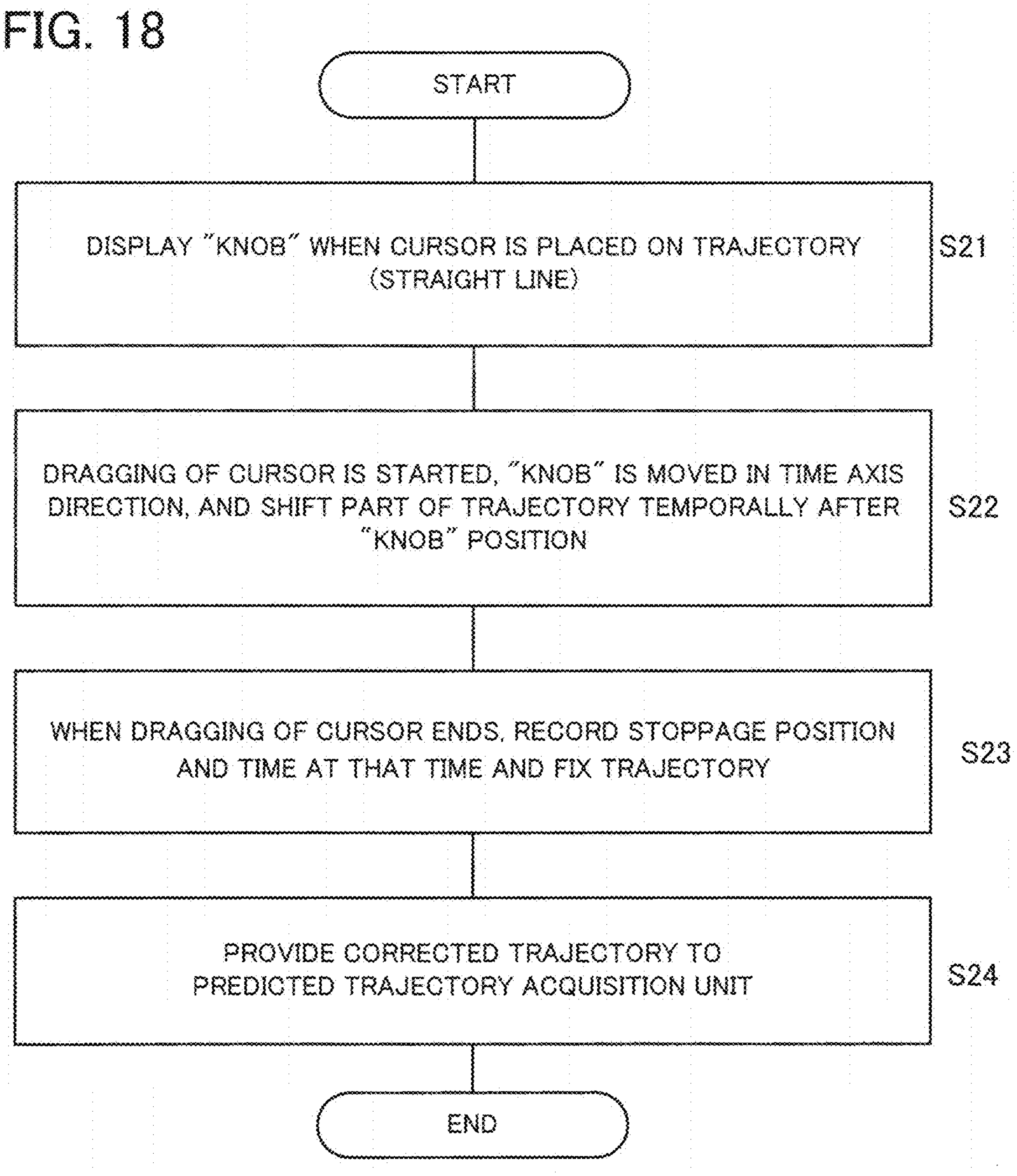
FIG. 18 is a flowchart showing the trajectory correction process of the display control device according to the embodiment.

FIG. 18 is a flowchart showing a trajectory correction process of the display control device 10 according to the embodiment. In step S21, when the cursor 303 is placed on the trajectory (straight line), the "knob 304" is displayed as shown in FIG. 17A.

In the next step S22, when dragging of the cursor 303 is started and the "knob 304" is moved in the time axis direction, the trajectory correction unit 19 shifts part of the trajectory temporally after the "knob 304" (i.e., the third part 301*c*) accompanying the movement of the "knob 304" as shown in FIG. 17C.

In the next step S23, when the dragging of the cursor 303 ends, the trajectory correction unit 19 records a stoppage position and the time at that time and fixes the trajectory as shown in FIG. 17D.

In the next step S24, the trajectory correction unit 19 provides the corrected trajectory to the predicted trajectory acquisition unit 15.

Figure 19B:
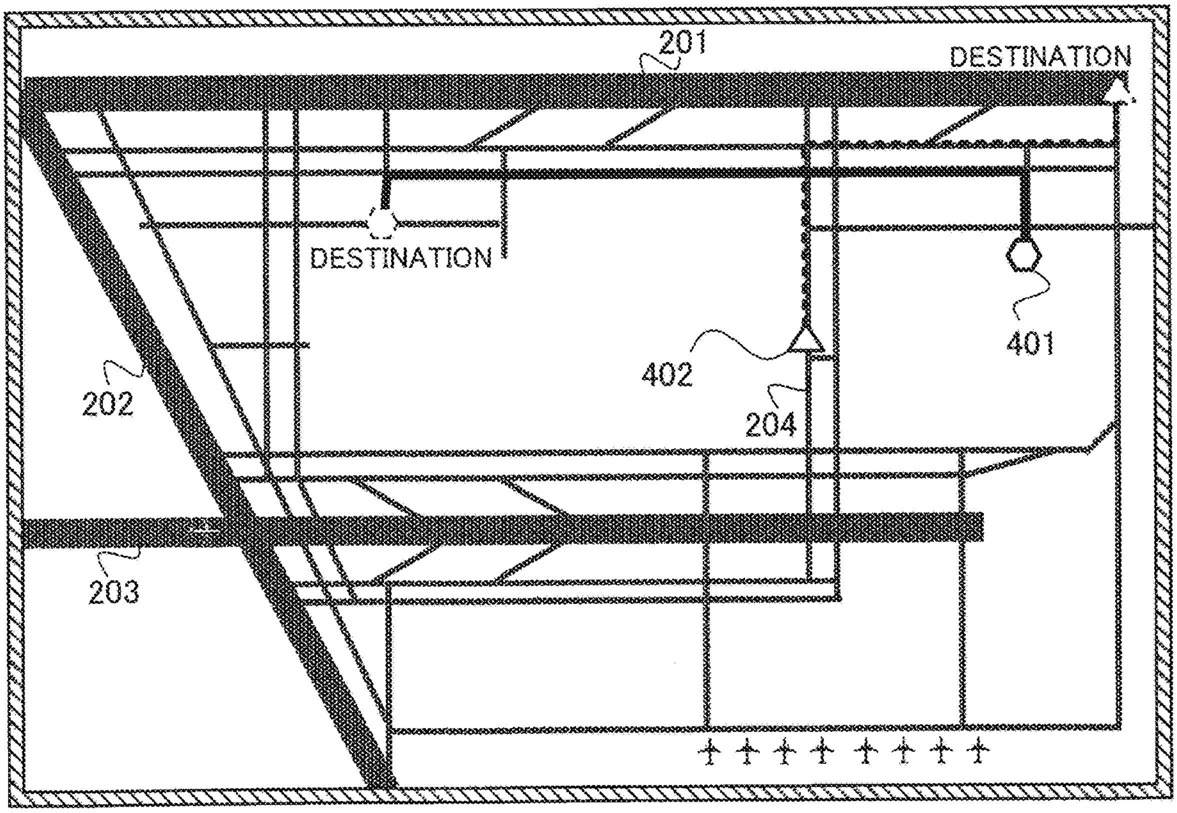
Figure 20A:
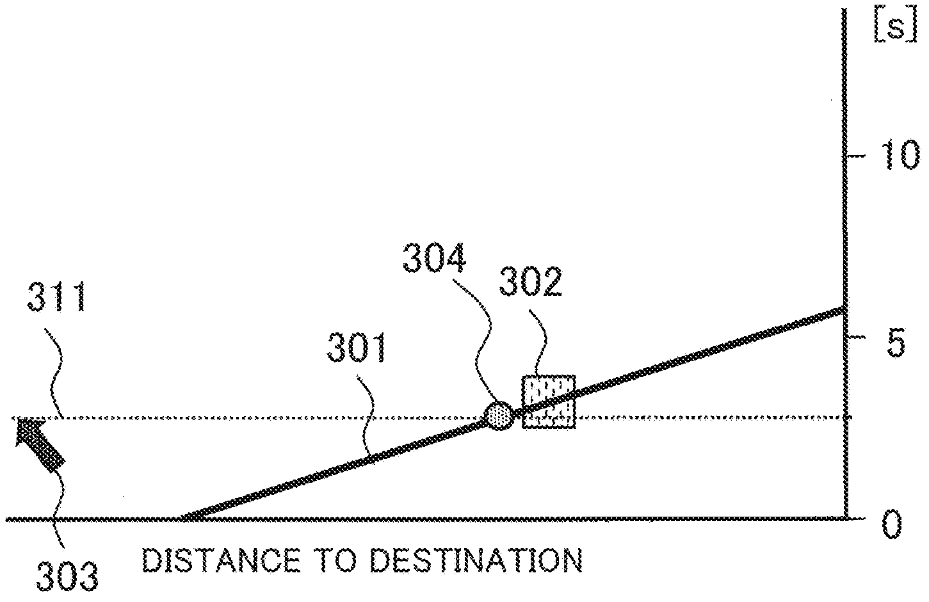
FIGS. 20A and 20B are diagrams (No. 2) showing an example of the diagram screen and the situation screen at the time of the trajectory correction.
Figure 20B:
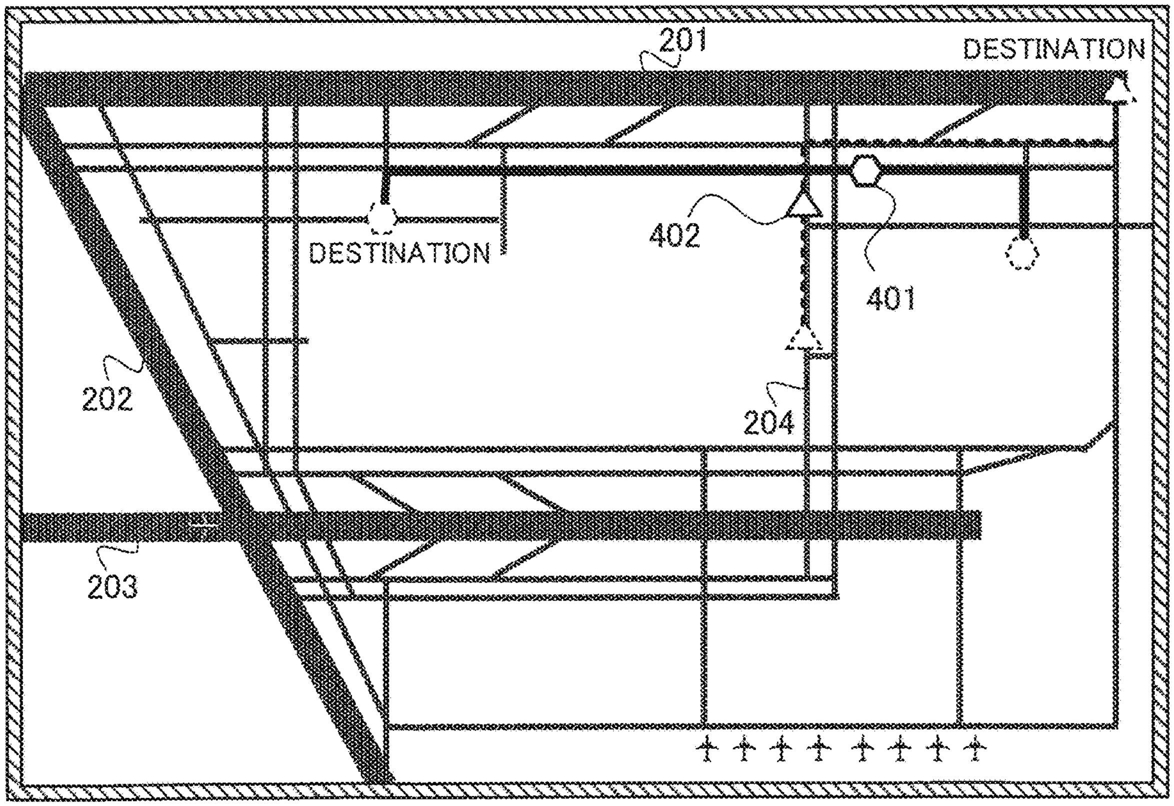

FIGS. 19A and 19B are diagrams (No. 1) showing an example of the diagram screen and a situation screen at the time of the trajectory correction. FIGS. 20A and 20B are diagrams (No. 2) showing an example of the diagram screen and the situation screen at the time of the trajectory correction. For example, when a seek bar 311 in FIG. 19A is moved along the time axis and placed at the position shown in FIG. 20A by a user operation, a mobile object 401 moves from its start point (position indicated by a broken line hexagon) to a position before an intersection (position indicated by a solid line hexagon) and a mobile object 402 moves from its start point (position indicated by a broken line triangle) to a position before the intersection (position indicated by a solid line triangle) as shown in the situation screens in FIG. 19B and FIG. 20B. As above, by moving the seek bar 311 in the diagram screen by a user operation (e.g., moving a cursor), the positions of the mobile objects 401 and 402 at the time indicated by the seek bar 311 can be moved on the situation screen.

Figure 21A:
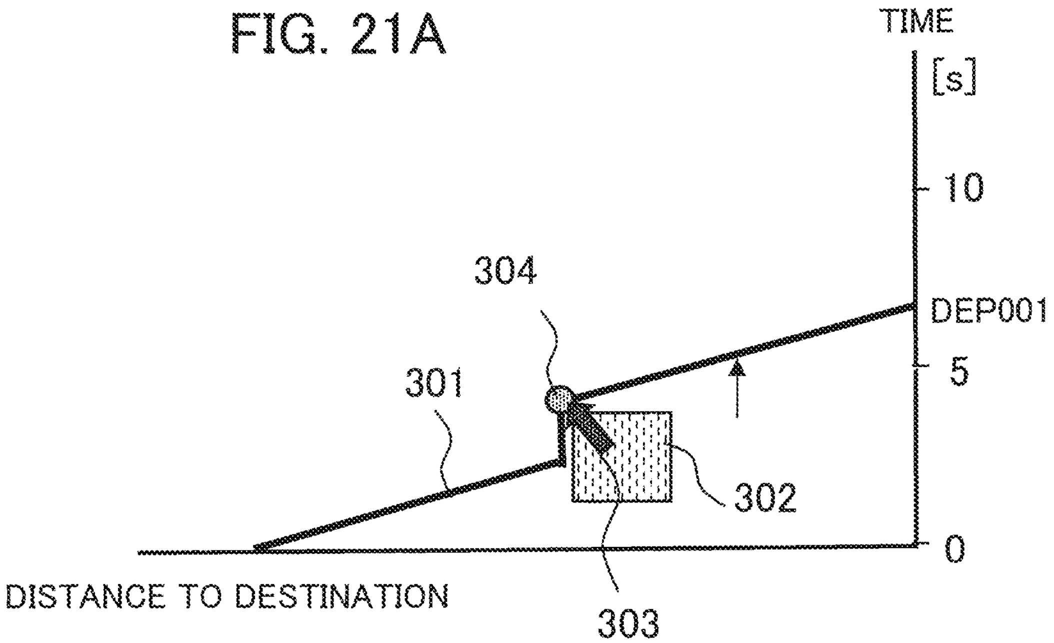
FIGS. 21A and 21B are diagrams showing an example of the diagram screen and the situation screen at the time of the trajectory correction.
Figure 21B:
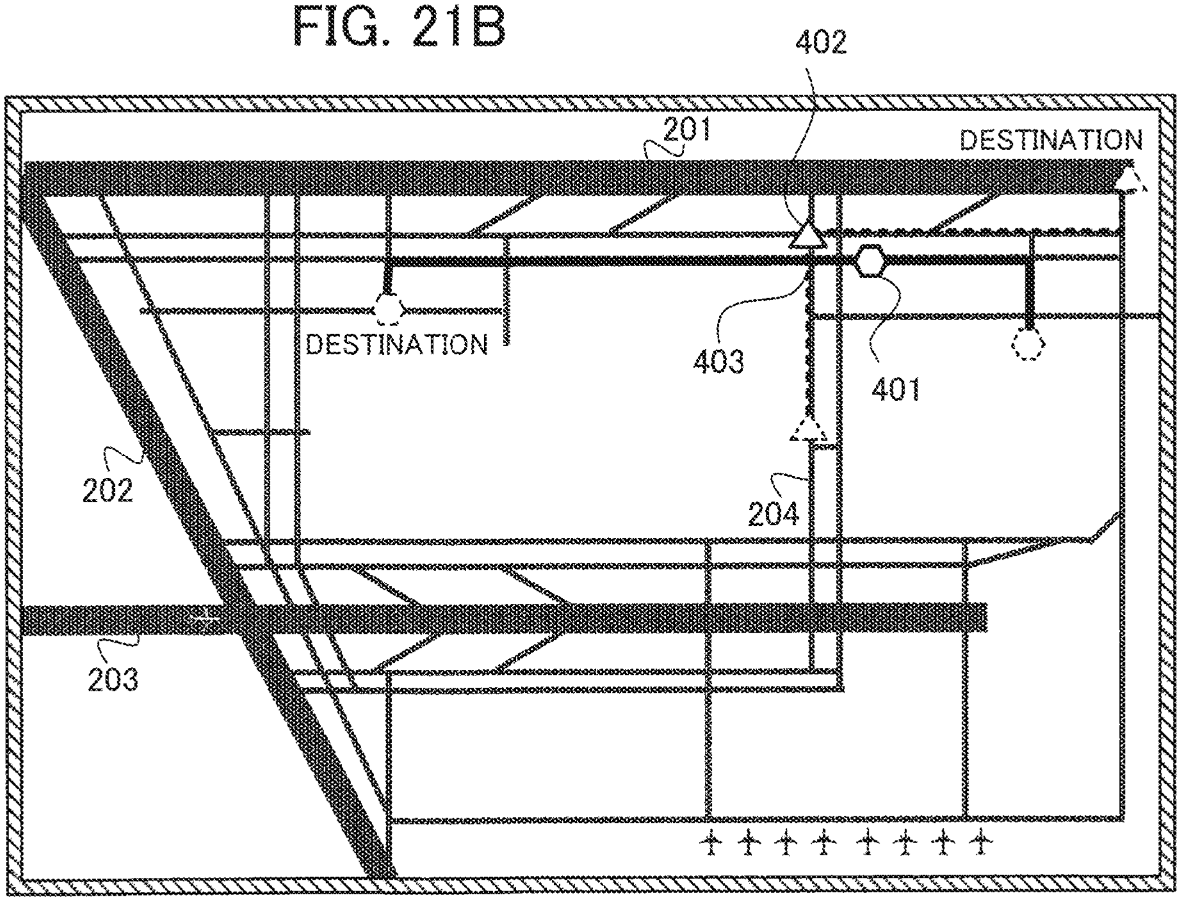

FIGS. 21A and 21B are diagrams showing an example of the diagram screen and the situation screen at the time of the trajectory correction. When the trajectory correction is not made, there is a danger of collision of the mobile objects 401 and 402 at an intersection 403 in FIG. 21B. However, by making the trajectory correction by moving the "knob 304" upward as shown in FIG. 21A, the mobile object 401 stays on standby for a time corresponding to the amount of the shift of the "knob 304", and thus the collision of the mobile objects 401 and 402 at the intersection 403 does not occur as shown in the situation screen in FIG. 21B.

Figure 22A:
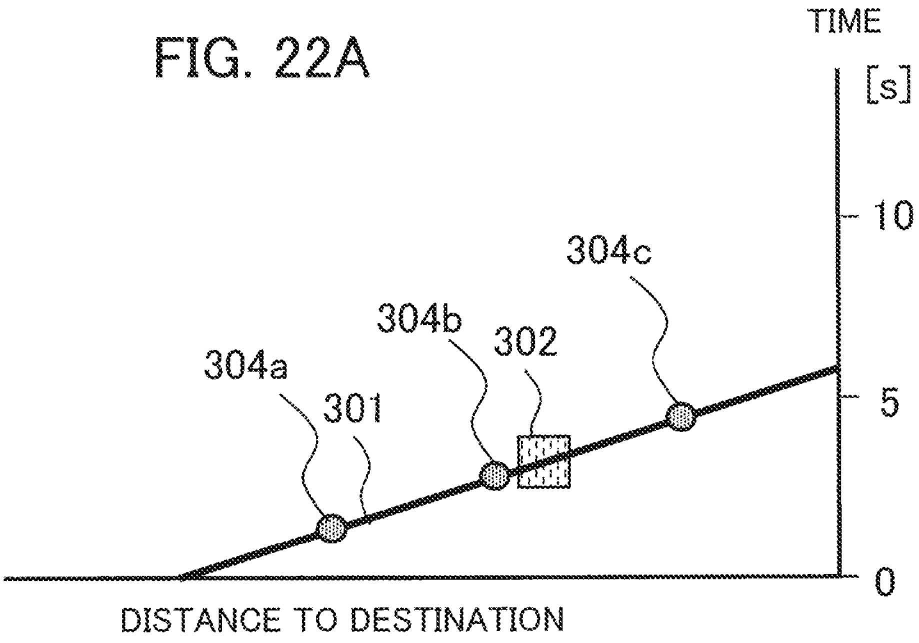
FIGS. 22A and 22B are diagrams showing another example of the diagram screen and the situation screen at the time of the trajectory correction.
Figure 22B:
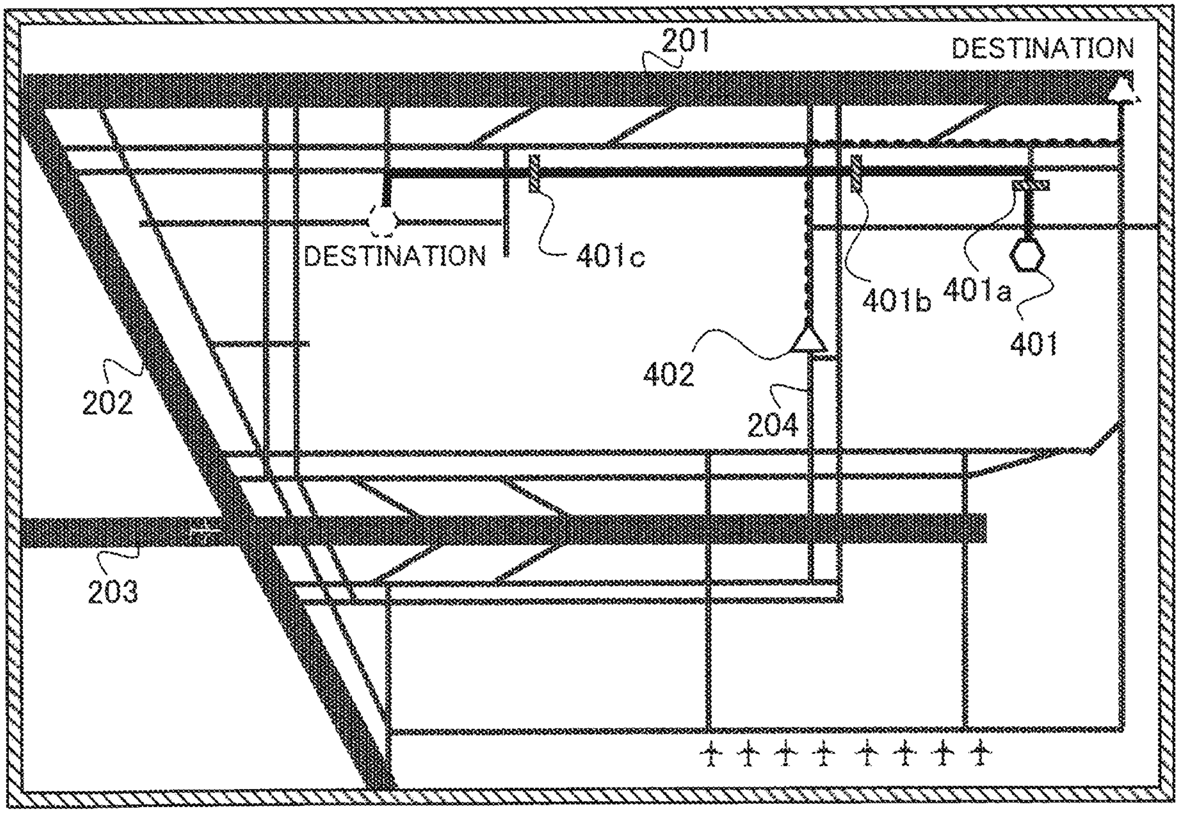

FIGS. 22A and 22B are diagrams showing another example of the diagram screen and the situation screen at the time of the trajectory correction. While the example in which the "knob 304" is displayed when the cursor is placed on the line 301 indicating the trajectory is described in regard to the diagram screen in FIG. 19A, it is also possible to display a "knob" to be used for correcting the trajectory at a predetermined position (e.g., a position on the diagram screen corresponding to a position before the position where tracks intersect with each other). In FIG. 22A, "knobs 304*a*, 304*b* and 304*c*" are respectively displayed at positions corresponding to positions 401*a*, 401*b* and 401*c* in FIG. 22B.

As described above, according to this embodiment, the stoppage position and the stoppage time of the mobile object can be set by operating the "knob" for correcting the trajectory (display component) displayed on the diagram screen by using a mouse, a touch panel or the like. That is, in this embodiment, the operation for avoiding the abnormal approach (that can include collision) of mobile objects can be carried out on the diagram screen of the two-dimensional coordinate system, and thus the route setting for avoiding the abnormal approach region can be made by the intuitive method of setting the stoppage time and the stoppage position so that the line indicating the trajectory does not overlap with the dangerous region.

Further, according to this embodiment, the stoppage position and the stoppage time of the mobile object can be set by automatically operating the "knob" for correcting the trajectory (display component) displayed on the diagram screen, such as by use of AI (Artificial Intelligence) operating by using a learning model generated by a learning device.

DESCRIPTION OF REFERENCE CHARACTERS

1: control system, 10: display control device, 11: storage device, 12: track structure data acquisition unit, 13: control information acquisition unit, 14: predicted trajectory estimation unit, 15: predicted trajectory acquisition unit, 16: abnormal approach estimation unit, 17: display control unit, 18: input device, 19: trajectory correction unit, 30: control information management device (management device), 40: display device, 201-203: runway (track), 204: taxiway (track), 221: enhanced display component, 302: abnormal approach region, 223: head-on region (enhanced region), 301: line indicating trajectory (predicted trajectory), 303: cursor, 304, 304*a*-304*c*: knob (display component), 401, 402: mobile object.

What is claimed is:

1. A display control device in a control system, the control system transmitting commands to a plurality of mobile objects traveling on a plurality of tracks, the display control device comprising:

processing circuitry to acquire track structure data indicating structure of the plurality of tracks;

to acquire control information from a management device that manages the control information including positions and operation schedules of the plurality of mobile objects;

to estimate a plurality of predicted trajectories indicating movement routes of the plurality of mobile objects based on the track structure data and the control information;

to acquire a first predicted trajectory indicating the movement route of a first mobile object as a mobile object selected as a monitoring target from among the plurality of mobile objects and a plurality of second predicted trajectories among the plurality of predicted trajectories indicating the movement routes of a plurality of second mobile objects among the plurality of mobile objects being mobile objects other than the first mobile object from the plurality of predicted trajectories;

to estimate a second mobile object as a mobile object having an abnormal approach period in which a distance from the first mobile object is less than or equal to a predetermined reference value out of the plurality of second mobile objects based on the track structure data, the first predicted trajectory and the plurality of second predicted trajectories;

to make a display device display a two-dimensional coordinate system formed by a first coordinate axis representing positions from a start point to an end point of the first predicted trajectory by distances from the start point or the end point and a second coordinate axis representing a time, a line indicating the first predicted trajectory in the two-dimensional coordinate system, and an abnormal approach region indicating ranges of the position and the time of the second mobile object in the abnormal approach period; and to make the display device display a display component for updating the first predicted trajectory, and upon receiving input information for moving the display component, to correct the first predicted trajectory so that the line indicating the first predicted trajectory does not overlap with the abnormal approach region.

2. The display control device according to claim 1, wherein the display component is a dot-like component overlapping with the line indicating the first predicted trajectory displayed on the display device and not overlapping with the abnormal approach region.

3. The display control device according to claim 1, wherein the display component is displayed at a position of a time temporally earlier than the time range of the abnormal approach region.

4. The display control device according to claim 1, wherein when there occurs a user input operation for moving the display component displayed on the display device in a direction of the second coordinate axis, the processing circuitry generates an updated predicted trajectory by moving part of the line indicating the first predicted trajectory temporally after the display component in the direction of the movement of the display component.

5. The display control device according to claim 4, wherein a line indicating the updated predicted trajectory includes:

a first part as a line segment in a range temporally before the display component;

a third part as a line segment in a range temporally after the display component; and a second part as a line segment connecting the first part and the third part.

6. The display control device according to claim 1, wherein the movement routes of the plurality of mobile objects includes an intersection of a first track and a second track intersecting with each other among the plurality of tracks with the first mobile object traveling on the first track and the second mobile object traveling on the second track.

7. The display control device according to claim 1, wherein movement routes of the plurality of mobile objects includes one track among the plurality of tracks with the first mobile object and the second mobile object traveling in a same direction as each other.

8. The display control device according to claim 1, wherein movement routes of the plurality of mobile objects includes one track among the plurality of tracks with the first mobile object and the second mobile object traveling in directions of approaching each other and being opposite to each other.

9. The display control device according to claim 1, wherein the processing circuitry changes the reference value based on one or more items of information out of information regarding a visibility range in atmospheric air at the plurality of tracks acquired from the management device, information regarding a wind direction and wind speed at the plurality of tracks acquired from the management device, and information regarding size of the first mobile object acquired from the management device.

10. The display control device according to claim 1, further comprising a storage device to store the track structure data.

11. The display control device according to claim 1, further comprising an input device to be operated by a user for inputting the input information for moving the display component.

12. The display control device according to claim 1, wherein the plurality of mobile objects include an aircraft, a vehicle, or both of an aircraft and a vehicle, and the plurality of tracks include a taxiway and a runway in an airport.

13. A display control method to be executed by a display control device in a control system, the control system transmitting commands to a plurality of mobile objects traveling on a plurality of tracks, the display control method comprising:

acquiring track structure data indicating structure of the plurality of tracks;

acquiring control information from a management device that manages the control information including positions and operation schedules of the plurality of mobile objects;

estimating a plurality of predicted trajectories indicating movement routes of the plurality of mobile objects based on the track structure data and the control information;

acquiring a first predicted trajectory indicating the movement route of a first mobile object as a mobile object selected as a monitoring target from among the plurality of mobile objects and a plurality of second predicted trajectories among the plurality of predicted trajectories indicating the movement routes of a plurality of second mobile objects among the plurality of mobile objects being mobile objects other than the first mobile object from the plurality of predicted trajectories;

estimating a second mobile object as a mobile object having an abnormal approach period in which a distance from the first mobile object is less than or equal to a predetermined reference value out of the plurality of second mobile objects based on the track structure data, the first predicted trajectory and the plurality of second predicted trajectories;

making a display device display a two-dimensional coordinate system formed by a first coordinate axis representing positions from a start point to an end point of the first predicted trajectory by distances from the start point or the end point and a second coordinate axis representing a time, a line indicating the first predicted trajectory in the two-dimensional coordinate system, and an abnormal approach region indicating ranges of the position and the time of the second mobile object in the abnormal approach period; and making the display device display a display component for updating the first predicted trajectory, and upon receiving input information for moving the display component, correcting the first predicted trajectory so that the line indicating the first predicted trajectory does not overlap with the abnormal approach region.

14. A non-transitory computer-readable storage medium for storing a display control program that causes a display control device in a control system, the control system transmitting commands to a plurality of mobile objects traveling on a plurality of tracks to execute processes of acquiring track structure data indicating structure of the plurality of tracks;

acquiring control information from a management device that manages the control information including positions and operation schedules of the plurality of mobile objects;

estimating a plurality of predicted trajectories indicating movement routes of the plurality of mobile objects based on the track structure data and the control information;

acquiring a first predicted trajectory indicating the movement route of a first mobile object as a mobile object selected as a monitoring target from among the plurality of mobile objects and a plurality of second predicted trajectories among the plurality of predicted trajectories indicating the movement routes of a plurality of second mobile objects among the plurality of mobile objects being mobile objects other than the first mobile object from the plurality of predicted trajectories;

estimating a second mobile object as a mobile object having an abnormal approach period in which a distance from the first mobile object is less than or equal to a predetermined reference value out of the plurality of second mobile objects based on the track structure data, the first predicted trajectory and the plurality of second predicted trajectories;

making a display device display a two-dimensional coordinate system formed by a first coordinate axis representing positions from a start point to an end point of the first predicted trajectory by distances from the start point or the end point and a second coordinate axis representing a time, a line indicating the first predicted trajectory in the two-dimensional coordinate system, and an abnormal approach region indicating ranges of the position and the time of the second mobile object in the abnormal approach period; and making the display device display a display component for updating the first predicted trajectory, and upon receiving input information for moving the display component, correcting the first predicted trajectory so that the line indicating the first predicted trajectory does not overlap with the abnormal approach region.

* * * * *